(12) United States Patent  
Ogasawara et al.

(10) Patent No.: US 7,031,038 B2  
(45) Date of Patent: Apr. 18, 2006

(54) HOLOGRAM APPARATUS CAPABLE OF DETECTING AND CORRECTING DISTORTION OF HOLOGRAM IMAGE

(75) Inventors: Masakazu Ogasawara, Tsurugashima (JP); Akihiro Tachibana, Tsurugashima (JP); Yoshihisa Kubota, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/041,724

(22) Filed: Jan. 25, 2005

(65) Prior Publication Data

US 2005/0162719 A1 Jul. 28, 2005

(30) Foreign Application Priority Data

Jan. 26, 2004 (JP) ............................. 2004-016450
Nov. 5, 2004 (JP) ............................. 2004-322107

(51) Int. Cl.
*G03H 1/08* (2006.01)
(52) U.S. Cl. .......................................... 359/22; 359/10
(58) Field of Classification Search ................. 359/10, 359/22, 16, 11; 369/112.24, 112.1
See application file for complete search history.

(56) References Cited

U.S. PATENT DOCUMENTS

| 5,555,128 A * | 9/1996 | Khoury et al. .............. 359/559 |
| 2004/0109401 A1* | 6/2004 | Ogasawara ............. 369/112.19 |
| 2005/0105152 A1* | 5/2005 | Kang .......................... 359/22 |

FOREIGN PATENT DOCUMENTS

JP  11-311937 A  11/1999

* cited by examiner

*Primary Examiner*—Fayez G. Assaf
(74) *Attorney, Agent, or Firm*—Sughrue Mion, PLLC

(57) ABSTRACT

A hologram apparatus includes a light beam interfering section for allowing reference and signal light beams to interfere to form a hologram recording region; a reproducing section for allowing the reference light beam to be incident on the recording region and generating a reproduced light; an image sensor for detecting a hologram-reproduced image; a distortion determining section for detecting the distortion-detecting data from the hologram-reproduced image to determine a distortion of the hologram-reproduced image; a distortion corrector for correcting a distortion of the hologram-reproduced image; and a controller for correcting the distortion in accordance with a determined distortion.

14 Claims, 35 Drawing Sheets

MODULATION IMAGE ON
SPATIAL LIGHT MODULATOR

REPRODUCED IMAGE (FREE OF DISTORTION)

PINCUSHION DISTORTION

BARREL DISTORTION

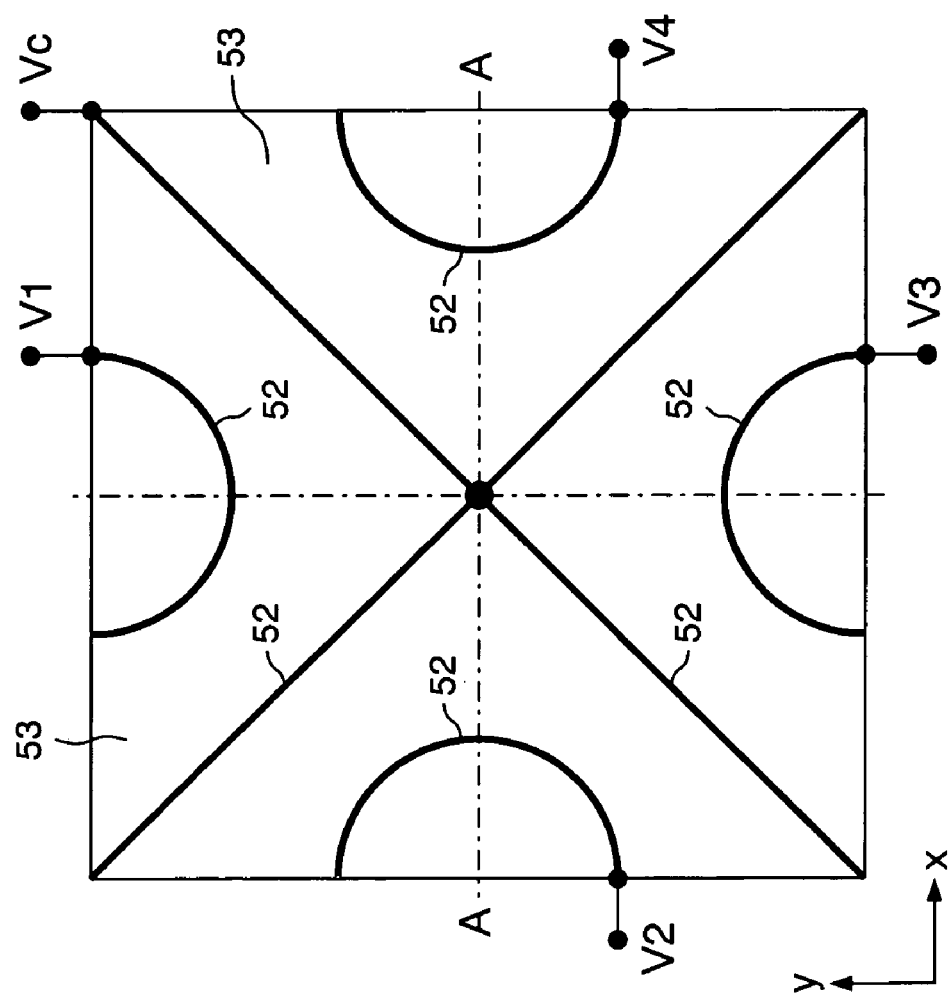

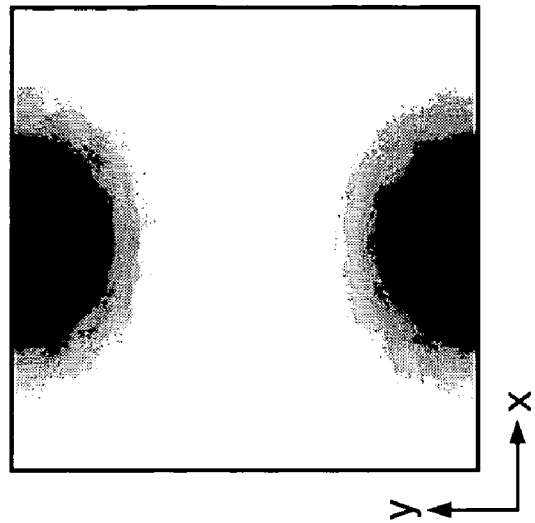
FIG.9C  V1=V3, V2=V4=Vc
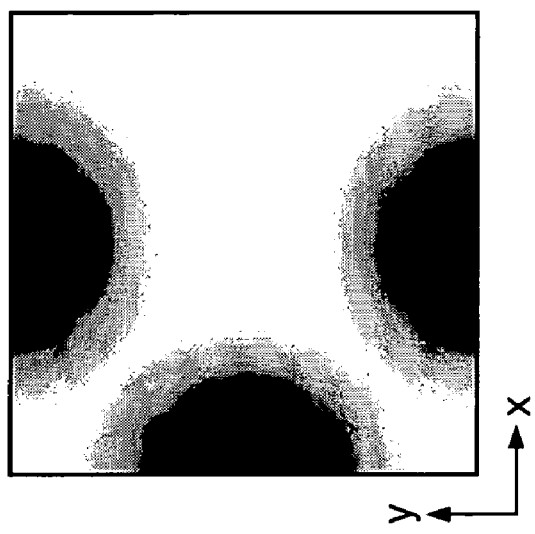
FIG.9B  V1=V2=V3, V4=Vc
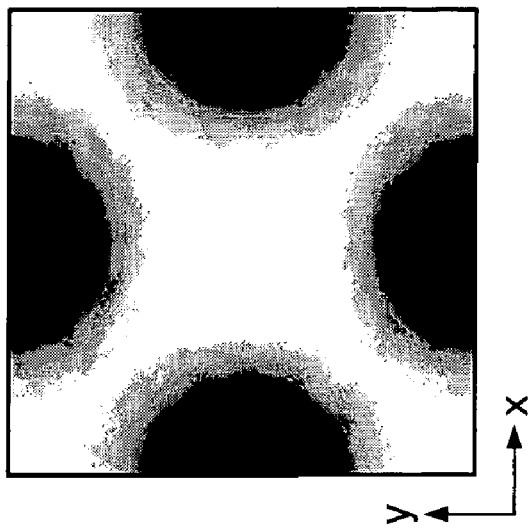
FIG.9A  V1=V2=V3=V4

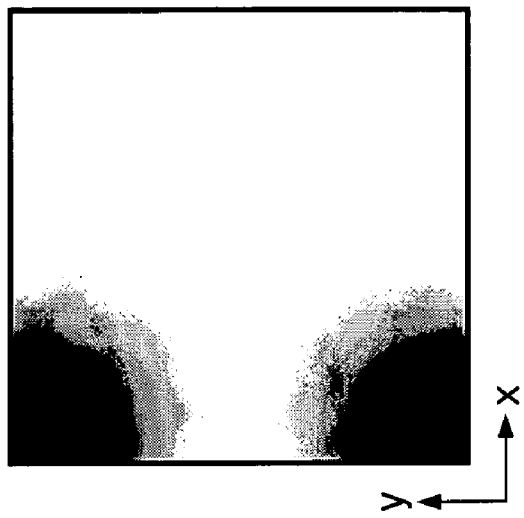
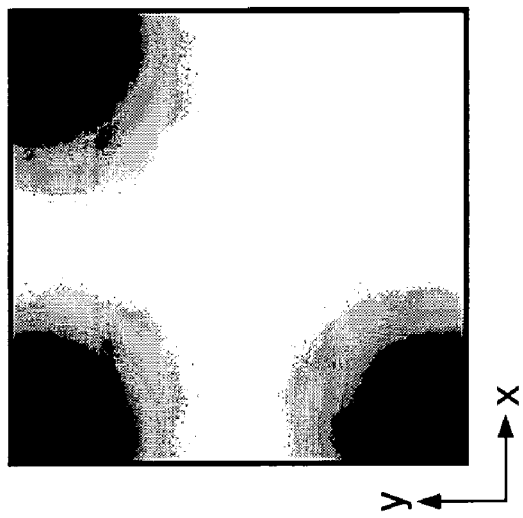
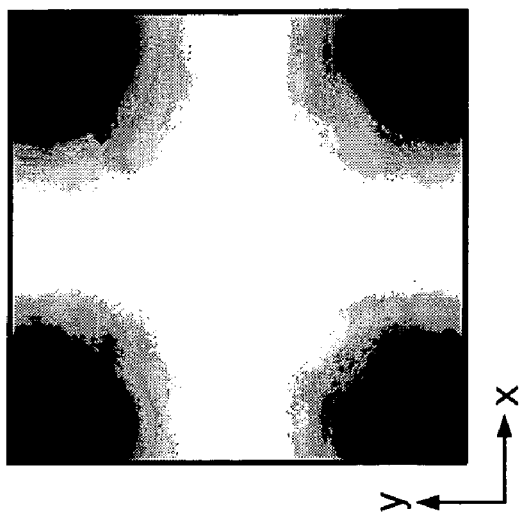

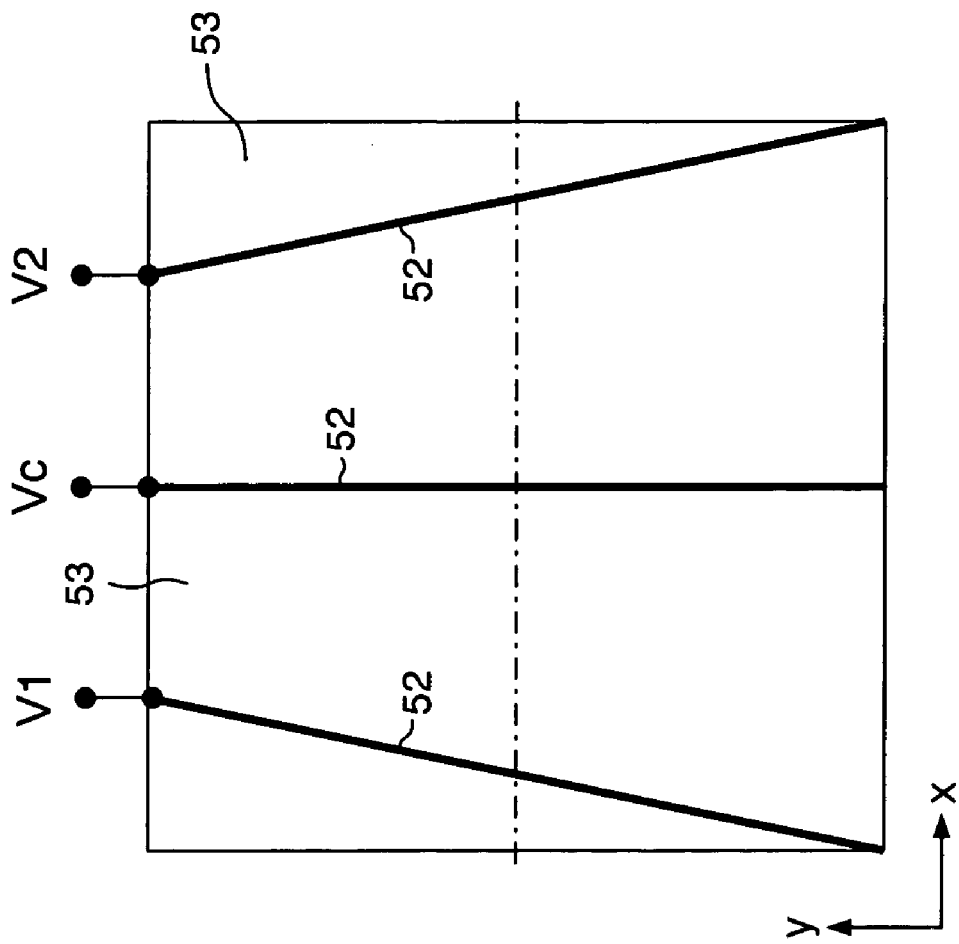

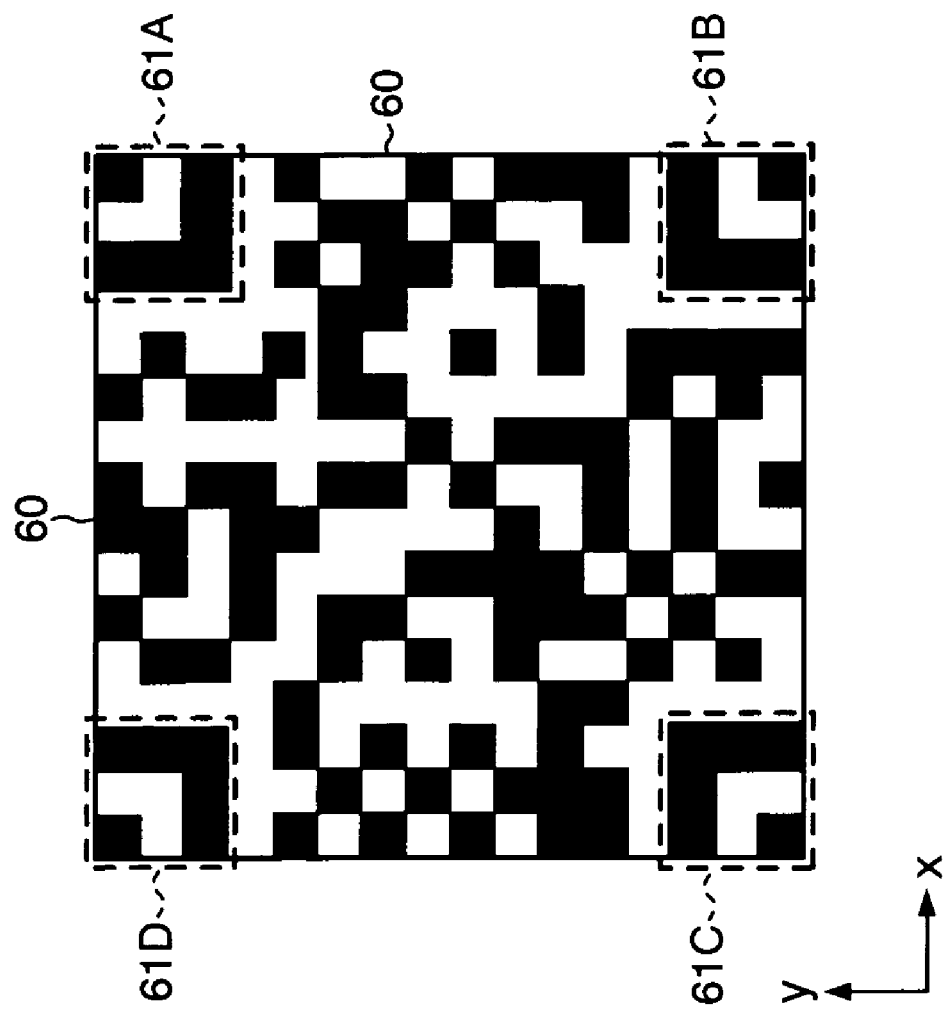

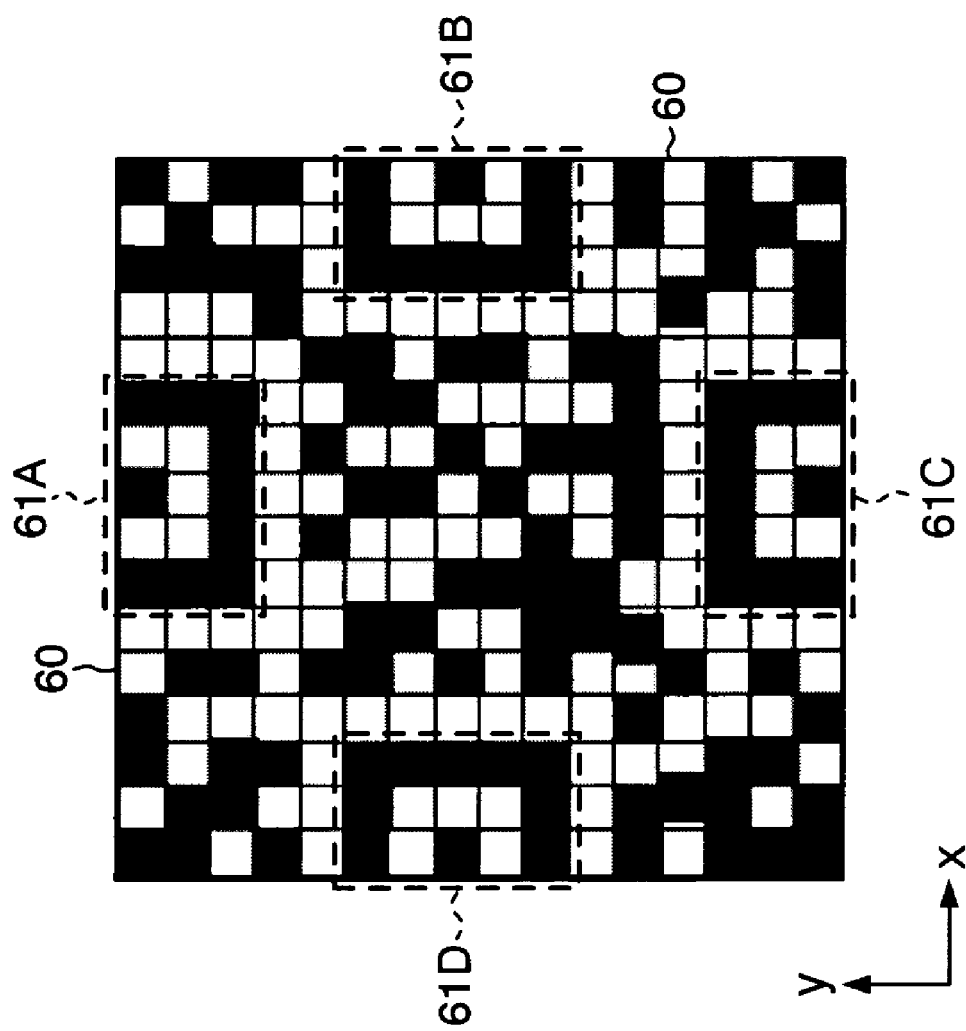

MARK REGION AND MARK DATA

REPRODUCED IMAGE

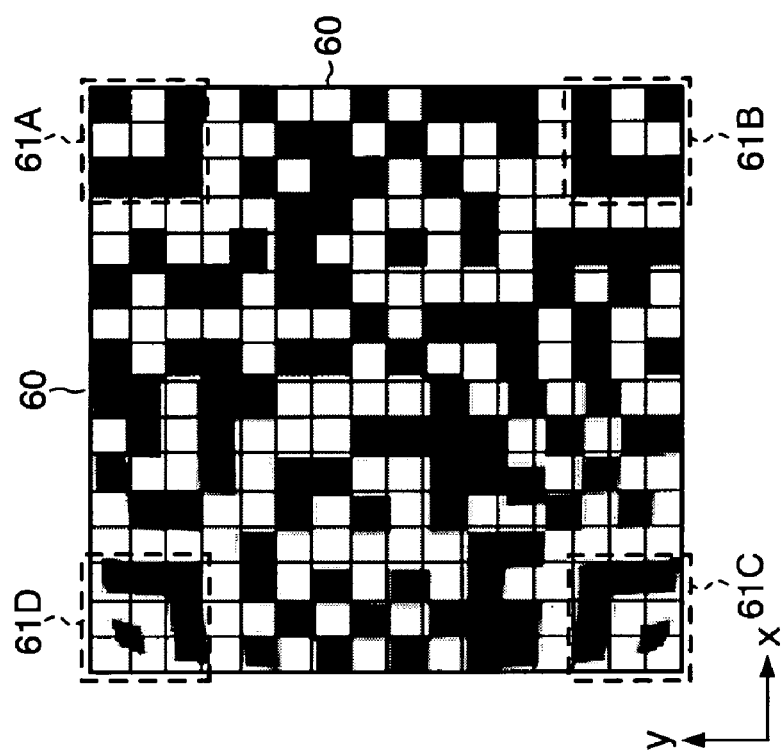
FIG.21B REPRODUCED IMAGE
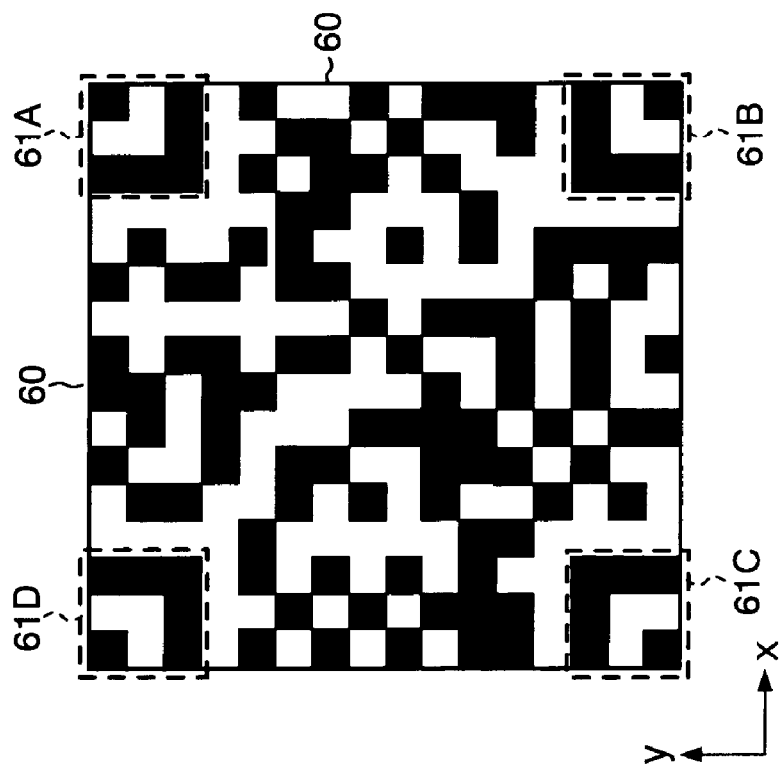
FIG.21A MARK REGION AND MARK DATA

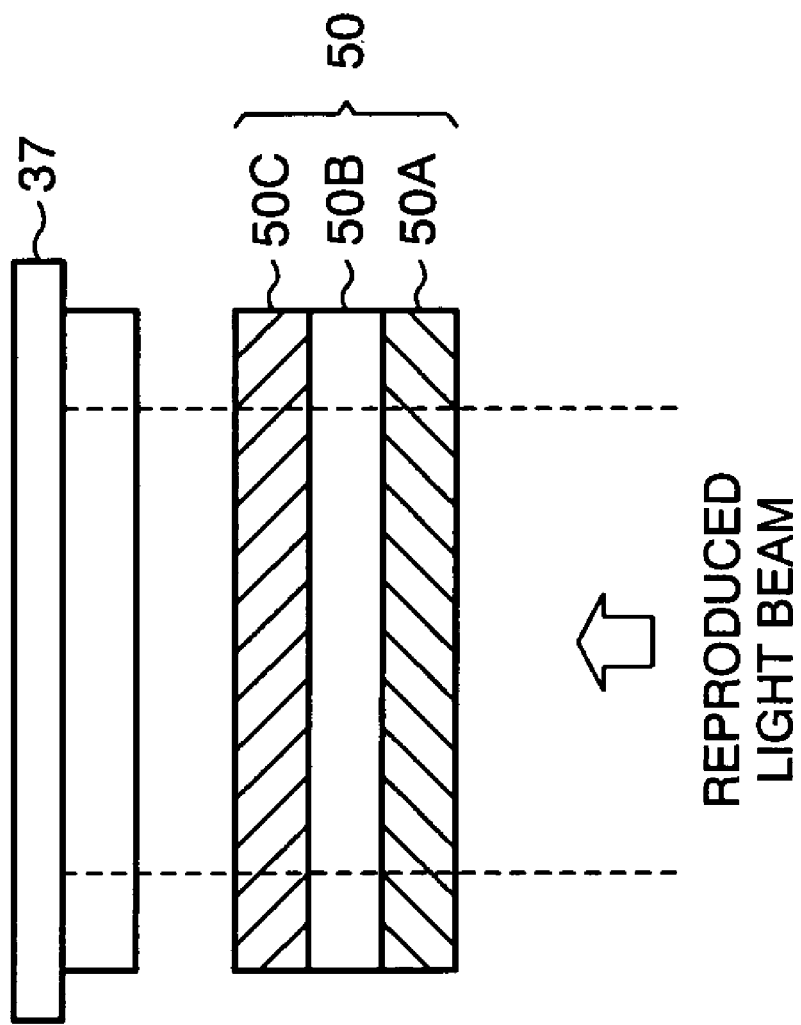

HOLOGRAM APPARATUS CAPABLE OF DETECTING AND CORRECTING DISTORTION OF HOLOGRAM IMAGE

BACKGROUND OF THE INVENTION

1. Field of the Invention

The present invention relates to a hologram apparatus, such as a hologram recording apparatus, a hologram reproducing apparatus or a hologram recording/reproducing apparatus, for recording and/or reproducing hologram to or from a recording medium of an optical disc, an optical card or the like, and more particularly to a hologram apparatus having a capability of correcting a distortion of a hologram image.

2. Description of the Related Art

In an attempt to record information with high density, attentions are drawn to a hologram technology capable of densely recording two-dimensional data signals. Hologram is characterized by recording a wavefront of light carrying recording information as a three-dimensional change of refractive index in a recording medium formed of a photo-sensitive material such as a photo-refractive material. For example, there is developed a recording/reproducing apparatus making use of a hologram recording medium as a disc (i.e., hologram disc) (see, Japanese Patent Application Kokai No. H11-311937).

In the hologram recording/reproducing apparatus, reference light is illuminated and converged as a spot on the reflection film through the recording layer. The reference light reflected form the reflection film is scattered to pass through the recording layer. Simultaneously, a signal beam of light carrying information which is to be recorded is passed through the recording layer. In the recording layer, interference of the reflected reference light and the signal light takes places to thereby form an interference pattern, thus enabling hologram recording in the recording layer. Meanwhile, by illuminating reference light to the hologram recording medium and detecting and demodulating the reproduced light from each hologram, information recorded can be reproduced.

However, distortion is caused in the reproduced image due to contraction or expansion of the recording material when hologram recording is performed thereon or aberration of the optical system. The distortion of the reproduced image includes a barrel distortion, a pincushion distortion, a trapezoidal distortion, a defocus (or defocusing) and a positional deviation of the image. Consequently, when reading out a recorded hologram, a distortion occurs in the reproduced image resulting in a mismatch between the light-receiving pixel and an image detection sensor such as a CMOS sensor or a CCD sensor. Due to this, reading is not successful from the region where there is distortion in the image, posing a problem of increased errors in read-out data.

In order to avoid such a problem, it is a practice to perform an over-sampling of data by use of an image detection sensor having pixels greater in the number than those of the spatial light modulator so that correction can be made by image processing when carrying out data reading.

Meanwhile, the conventional aberration corrector, for correcting an aberration (coma aberration, spherical aberration, astigmatic aberration) on the recording medium, could not correct a distortion of hologram image on the photodetector (i.e., reproduced image detection sensor). Furthermore, the image distortion on the reproduced image detection sensor could not be corrected by the conventional aberration corrector because the image distortion is different from an aberration on the recording medium.

SUMMARY OF THE INVENTION

The problem the present invention is to solve includes, as one example, to provide a hologram apparatus capable of correcting a distortion of a hologram image. Meanwhile, provided is a hologram apparatus capable of detecting and correcting a distortion of a hologram image on a reproduced image detection sensor with correctness and at high speed to thereby correctly record data to a recording medium and correctly reproduce the data recorded thereon.

According to the present invention, there is provided a hologram apparatus for hologram recording and/or reproducing information data with a recording medium by use of a coherent light beam, which comprises a light beam generating section for generating a reference light beam and a coherent light beam coherent to the reference light beam; a spatial light modulator for spatially modulating the coherent light beam; a signal light beam generating section for driving the spatial light modulator by superimposing distortion-detecting data for detecting a distortion of a hologram-reproduced image on the information data to generate a signal light beam; a light beam interfering section for allowing the reference light beam and the signal light beam to enter the recording medium and causing interference, so as to form a hologram recording region by means of interference light; a reproducing section for allowing the reference light beam to be incident on the hologram recording region and generating a reproduced light corresponding to the signal light beam; an image sensor section for receiving the reproduced light to detect a hologram-reproduced image; a distortion determining section for detecting the distortion-detecting data from the hologram-reproduced image to determine a distortion of the hologram-reproduced image; a distortion corrector for correcting a distortion of the hologram-reproduced image; and a controller for adjusting the distortion corrector in accordance with a distortion determined by the distortion determining section to correct a distortion of the hologram-reproduced image.

BRIEF DESCRIPTION OF THE DRAWINGS

FIG. 5 is a view showing a reproduced image when data is recorded to a recording medium by the modulation pattern shown in FIG. 4 and the recorded data is reproduced in the absence of distortion, deformation or the like in the recording medium or the like;

FIG. 8 is a plan view schematically showing an electrode structure of the distortion corrector corresponding to barrel distortion;

FIGS. 9A–9C are plan views schematically showing phase difference distributions caused in applying various voltages to the metal electrodes of the distortion corrector shown in FIG. 8;

FIGS. 11A–11C are plan views schematically showing phase difference distributions caused in applying various voltages to the metal electrodes of the distortion corrector shown in FIG. 10;

FIG. 12 is a plan view schematically showing an electrode structure of a distortion corrector for correcting trapezoidal distortion;

FIG. 14 is a plan view showing an example of an image representing page data, illustrating mark regions (shown by surrounding with broken lines) and mark data to be set in correcting barrel distortion;

FIG. 19 is a plan view showing a reproduced image on the image detection sensor after the pincushion distortion shown in FIG. 18 has been corrected;

FIGS. 21A and 21B are a plan view showing mark regions (broken lines) and mark data to be set in correcting one-sided barrel distortion, and a plan view showing a reproduced image on the image detection sensor in the presence of one-sided barrel distortion;

FIG. 22 is a view schematically showing a structure of a distortion corrector for correcting combined distortion by combining the correctors for pincushion distortion, barrel distortion and trapezoidal distortion, according to a third embodiment of the present invention.

DETAILED DESCRIPTION OF THE INVENTION

Embodiments of the present invention will now be described in detail with reference to the drawings. Incidentally, the equivalent constituent elements are attached with the same references in the embodiments described below.

FIRST EMBODIMENT

Figure 1:
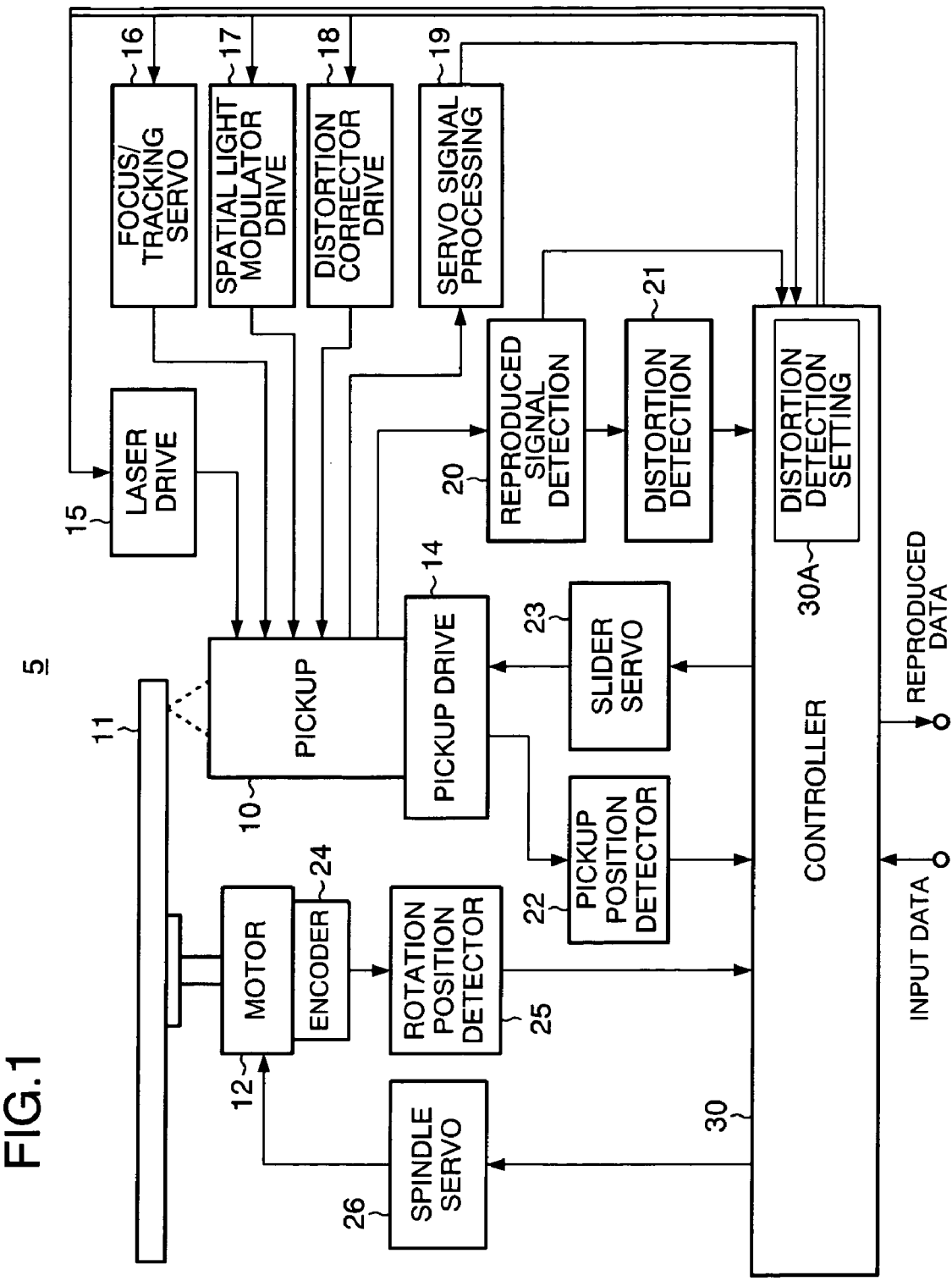
FIG. 1 is a block diagram schematically showing a configuration of a hologram recording/reproducing apparatus according to a first embodiment of the present invention.

FIG. 1 is a block diagram schematically showing a configuration of a hologram recording/reproducing apparatus 5 for hologram recording and/or hologram reproducing of a first embodiment of the present invention.

A hologram disc 11, mounted on a turntable, is to be rotated by a spindle motor 12. An optical pickup 10, for reading a signal out of the hologram disc 11 by means of a light beam, is held by a pickup drive section 14 and to be moved in the radial direction of the disc. The optical pickup 10 is connected to a laser light-source drive circuit 15, a focus & tracking servo circuit 16, a spatial-light-modulator drive circuit 17, a distortion-corrector drive circuit 18, a servo-signal processing circuit 19, a reproduced-signal detection processing circuit 20 and a distortion detecting circuit 21.

Meanwhile, the hologram recording/reproducing apparatus 5 has a pickup-position detecting circuit 22 connected to the pickup drive section 14 and for detecting a pickup position signal, and a slider servo circuit 23 connected to the pickup drive section 14 and for supplying to the pickup drive section 14 a control signal for slider control. Furthermore, provided are a rotation detecting section (i.e., encoder) 24 connected to the spindle motor 12 and for detecting a rotational speed signal of the spindle motor 12, a rotation position detecting circuit 25 connected to the rotation detecting section 24 and for generating a rotation position signal of the hologram disc 11, and a spindle servo circuit 26 connected to the spindle motor 12 and for supplying a control signal for rotation control of the spindle motor 12.

The hologram recording/reproducing apparatus 5 has a controller 30. The above-described circuits are connected to the controller 30 through a signal bus (not shown). The controller 30 is configured by a microcomputer mounting various memories and for performing control of the entire apparatus. Meanwhile, the controller 30 generates various control signals in accordance with a user's operation input form the operating section (not shown) and a current operation status of the apparatus. The controller 30 is connected to a display section (not shown) for displaying an operation status to the user.

Furthermore, the controller 30 performs an encode processing of the to-be-recorded data externally inputted and supplies a predetermined signal to the spatial-light-modulator drive circuit 17 for controlling the recording operation. Furthermore, the controller 30 performs a demodulation and correction processing based on a signal from the reproduced-signal detecting processing circuit 20 thereby restoring the data recorded on the hologram disc 11. Meanwhile, the controller 30 controls the distortion-corrector drive circuit 18 on the basis of a detection signal from the distortion detecting circuit 21, thereby making a control of distortion correction. Furthermore, the controller 30 performs a decode processing on the restored data thereby reproducing information data and outputting it as reproduced information data.

Figure 2:
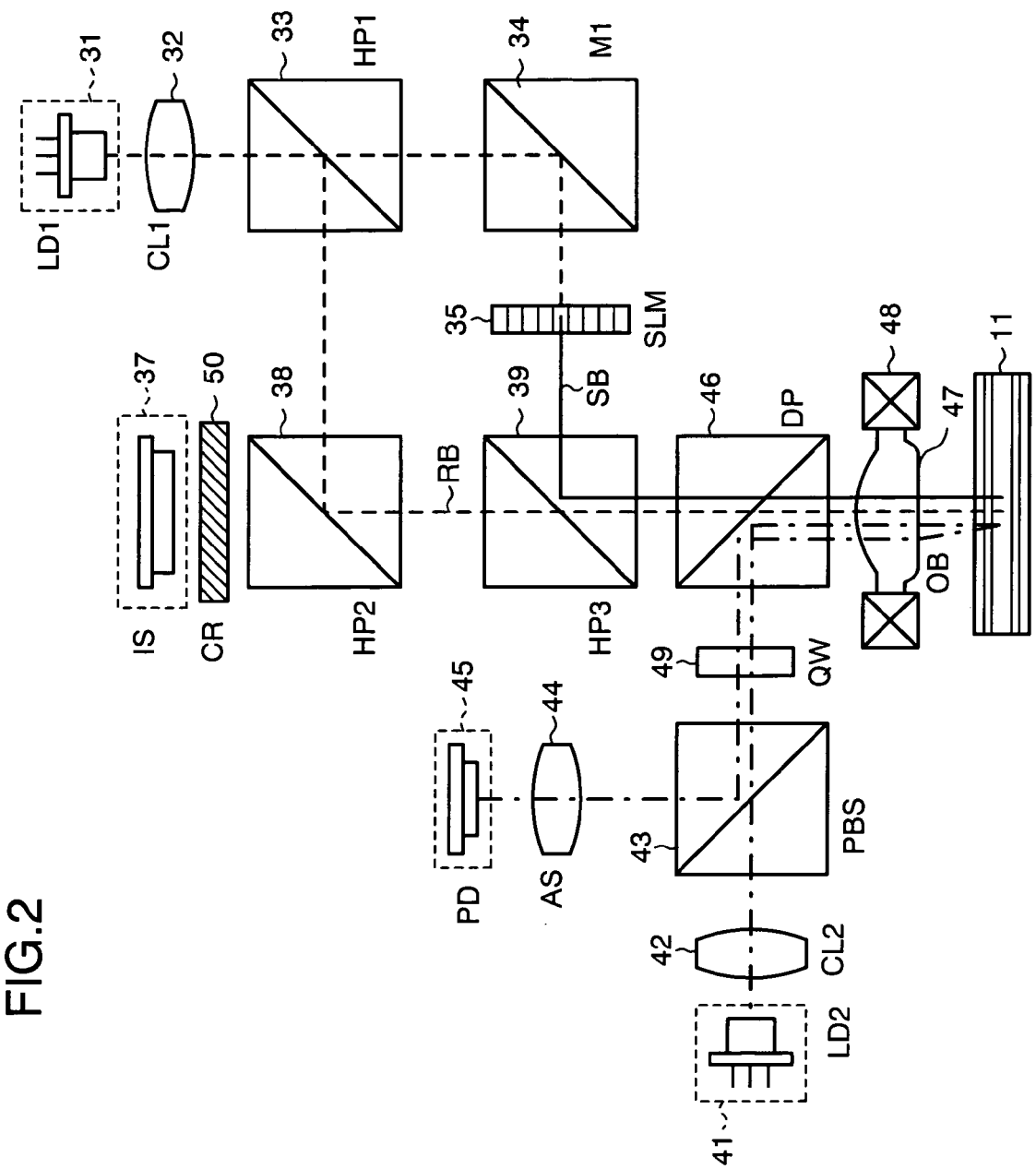
FIG. 2 is a view showing a pickup structure of the hologram recording/reproducing apparatus according to the first embodiment of the present invention, illustrating an optical path in recording data to a hologram disc.

FIG. 2 is a view showing the configuration of the optical pickup 10 in detail. Note that this shows a case of recording data on the hologram disc 11. The optical pickup 10 has a recording and reproducing optical system comprising a first laser light source (LD1) 31 for recording and reproducing hologram, a first collimator lens (CL1) 32, a first half-mirror prism (HP1) 33, a mirror (M1) 34, a spatial light modulator (SLM) 35, a distortion corrector (CR) 50, a reproduced signal detector (IS) 37 including an image detection sensor made by a CCD or an array of complementary metal-oxide film semiconductor devices, a second half-mirror prism. (HP2) 38 and a third half-mirror prism (HP3) 39.

Meanwhile, provided is a servo optical system for servo-controlling the position of a light beam (focus, tracking) relative to the hologram disc 11. More specifically, there is provided a second laser light source (LD2) 41, a second collimator lens (CL2) 42, a polarization beam splitter (PBS) 43, an astigmatic element (AS) 44 such as a cylindrical lens, and a photodetector (PD) 45. Furthermore, there is provided a common optical system comprising a dichroic prism (DP) 46 and an objective lens (OB) 47.

The half-mirror surfaces of the first, second and third half-mirror prisms (HP1, HP2, HP3) 33, 38, 39 and the reflection surface of the mirror 34 are arranged parallel one with another. The split surfaces of the dichroic prism (DP) 46 and the polarization beam splitter (PBS) 43 are arranged parallel with the normal line of the half-mirror and reflection surfaces. These optical components are arranged such that the optical beam axes of the first and second laser light sources (LD1, LD2) 31, 41 extend respectively to the recording/reproducing optical system and the servo system and nearly coincident in the common optical system.

Meanwhile, there is provided a spatial light modulator (SLM) 35 for spatially modulating a light beam. The spatial light modulator 35 is configured, for example, by a liquid-crystal panel having a plurality of pixel electrodes divided in a matrix form. The spatial light modulator in the present embodiment is described as a liquid-crystal spatial light modulator.

Furthermore, the optical pickup 10 includes an objective-lens drive section 48 made up by a focusing drive for moving the objective lens (OB) 47 in a direction of the optical axis and a tracking drive for moving the objective lens (OB) 47 in a radial direction of the disc that is vertical to the optical axis.

The first laser light source 31 is connected to the laser light-source drive circuit 15. The laser light-source drive circuit 15 adjusts the first laser light source 31 to output at a predetermined intensity of light beam during recording and reproducing. The first laser light source 31 emits a light beam of predetermined polarization.

The reproduced signal detector 37, including an image detection sensor, is connected to the reproduced-signal detection processing circuit 20.

The photodetector 45 is connected to the servo-signal processing circuit 19. The photodetector 45 includes a light-receiving element of a split type for use in focus and tracking servo generally used for the optical disc. Servo scheme is not limited to the astigmatic method but can employ a push-pull method. The photodetector 45 supplies an output signal, such as a focus error signal and a tracking error signal, to the servo-signal processing circuit 19.

In the servo-signal processing circuit 19, a focusing drive signal is produced from a focus error signal. The focusing drive signal is supplied to the focus & tracking servo circuit 16 through the controller 30. The focus & tracking servo circuit 16 drives a focusing part of the objective lens drive section 48 mounted on the optical pickup 10 according to the focusing drive signal. The focusing part operates to adjust the focal point of a spot of light illuminated to the hologram disc.

Furthermore, in the servo-signal processing circuit 19, a tracking drive signal is produced from a tracking error signal. The tracking drive signal is supplied to the focus & tracking servo circuit 16. The servo circuit 16 drives a tracking part of the objective-lens drive section 48 mounted on the optical pickup 10. The tracking part displaces the light spot incident on the hologram disc in the radial direction of the disc in an amount according to a drive current based on the tracking drive signal.

The controller 30 generates a slider drive signal on the basis of a position signal from the operating section or the pickup-position detecting circuit 22 and a tracking error signal from the servo-signal processing circuit 19, and supplies it to the slider servo circuit 23. The slider servo circuit 23 causes the optical pickup 10 to move in the radial direction of the disc through the pickup drive section 14, according to a drive current based on the slider drive signal.

The rotation detecting section (encoder) 24 detects a frequency signal representing a rotation frequency of the spindle motor 12 rotating the hologram disc 11 through the turntable, and generates a rotation-speed signal representing a spindle rotation speed corresponding to that and supplies it to the rotation-position detecting circuit 25. The rotation-position detecting circuit 25 generates a rotation-speed position signal and supplies it to the controller 30. The controller 30 generates a spindle-drive signal and supplies it to the spindle servo circuit 26, to thereby perform control of the spindle motor 12 and rotation drive of the hologram disc 11.

Description is made on a recording/reproducing method to record or reproduce information by illuminating a light beam to the hologram disc 11 through the use of the hologram recording/reproducing apparatus 5.

In recording, the first laser light source 31 emits a predetermined intensity of coherent light beam given as a P polarization, as shown in FIG. 2. The first half-mirror prism 33 separates the light beam into a reference light beam (RB) and a light beam for use in generating a signal light beam (SB), referred later. (These beams are shown by dotted lines and deviated from the optical axis in order for optical path illustration).

The light beam for signal light is reflected by the mirror 34, to enter the spatial light modulator (SLM) 35. The matrix-formed divided pixel regions of the spatial light modulator 35 respectively change the intensities of the corresponding portions of the incident light in accordance with an electric signal to the divisional pixel electrode. The spatial light modulator 35 modulates the light beam for signal light to provide a component distribution based on the to-be-recorded page data (two-dimensional data such as light/dark dot pattern on the plane) from the spatial-light-modulator drive circuit 17, and generates a modulation signal light beam (hereinafter, simply referred to as a signal light beam (SB)) (shown by the solid line).

The signal light beam (SB) transmitted through the spatial light modulator 35 travels toward the third half-mirror prism 39.

The reference light beam is reflected by the second half-mirror prism 38, to travel toward the third half-mirror prism 39.

The reference light beam and the signal light beam are joined together by use of the third half-mirror prism 39. The two light beams thus joined passes through the dichroic prism 46 and focused by the objective lens 47 on the hologram disc 11, thus hologram recording is performed.

Figure 3:
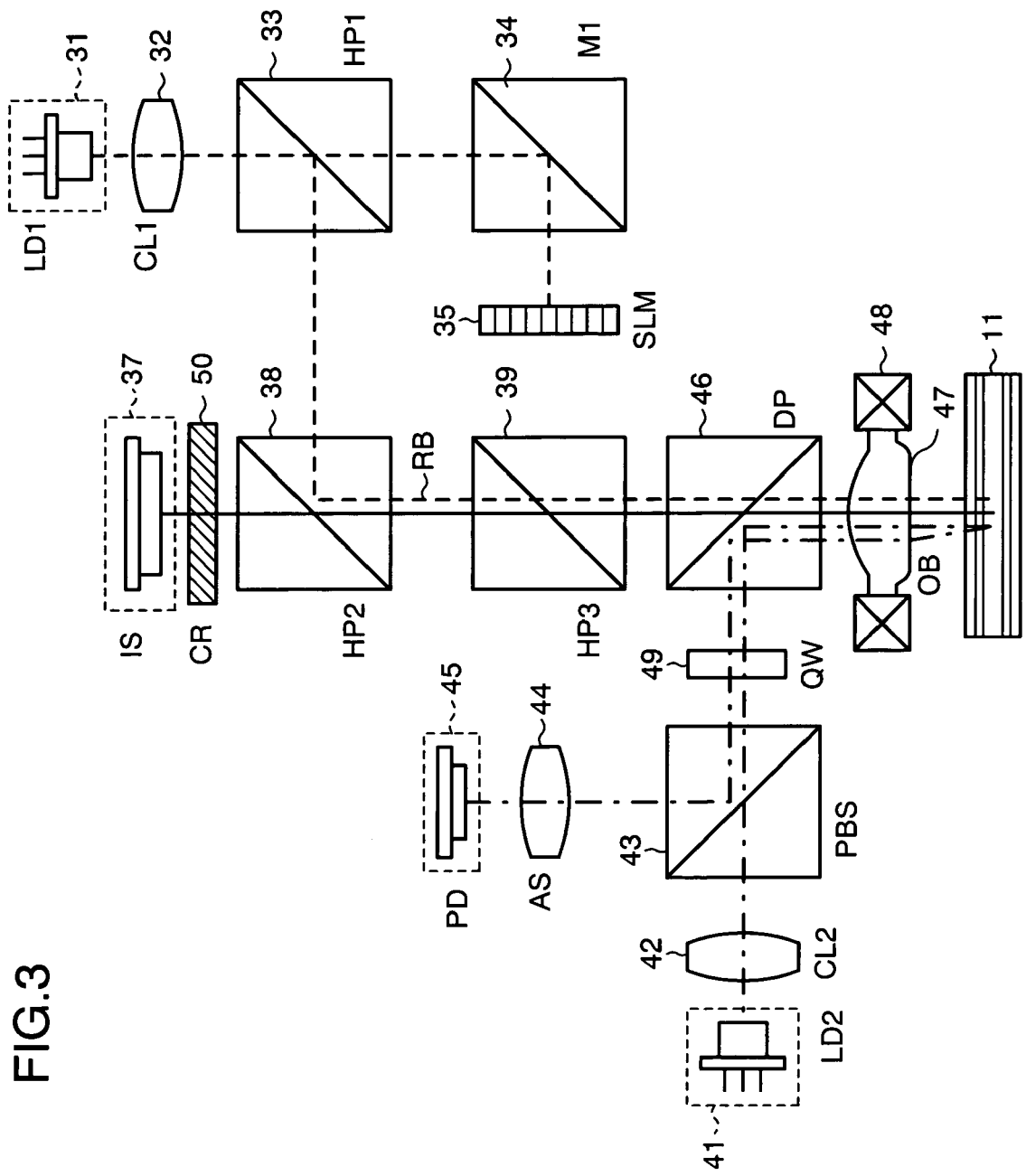
FIG. 3 is a view showing a pickup structure of the hologram recording/reproducing apparatus according to the first embodiment of the present invention, illustrating an optical path in reproducing data from a hologram disc.

On the other hand, in reproducing as shown in FIG. 3, although the light beam from the first laser light source 31 is split into two light beams by the first half-mirror prism 33 in a similar manner in recording, hologram reproduction is performed by means of the reference light beam only. Specifically, by placing the spatial light modulator 35 in a light blocking state, only the reference light from the second half-mirror prism 38 passes the dichroic prism 46 and the objective lens 47 to be incident on the hologram disc 11.

The reproduced light (shown by the solid line) generated from the hologram disc 11 passes the objective lens 47, the dichroic prism 46, the third half-mirror prism 39 and the second half-mirror prism 38 to be incident on the reproduced-signal detector 37 including an image detection sensor by way of the distortion corrector (CR) 50. The reproduced-signal detector 37 delivers an output corresponding to a reproduced image to the reproduced-signal detection processing circuit 20 where a reproduced signal is generated and supplied to the controller 30, thus reproducing the recorded page-data. Incidentally, a focus lens can be provided between the half-mirror prism 38 and the reproduced-signal detector 37.

In both recording and reproducing, the second laser light source 41 for servo control emits a coherent beam of light having a different wavelength from that of the first laser light source 31, as shown in FIGS. 2 and 3. The servo light beam (shown by one-dot chain lines) from the second laser light source 41 of a P-polarization light beam is guided into the servo-detection optical path of the second collimator lens (CL2) 42 and the polarization beam splitter (PBS) 43. However, immediately in front of the objective lens 47, it is joined with the signal light beam and the reference light beam by the dichroic prism 46. The servo light beam is reflected by the dichroic prism 46 and then focused by the objective lens 47 on the hologram disc 11. The return light of the servo light beam, reflected from the hologram disc 11 to the objective lens 47, is converged by a ¼-wavelength plate (QW) 49 into an S-polarization light beam. The returning light beam is passes the polarization beam splitter 43 and astigmatic element 44 and enters the servo light detector 45 along a normal line of a light-receiving surface thereof.

During hologram recording and hologram reproduction, servo control is carried out by means of a servo light beam in order for alignment with the hologram disc 11. When an astigmatism method is used, the photodetector 45 is configured as a 4-divided light-receiving element having four divisional light-receiving surfaces for the purpose of beam reception. The divisional lines into four are in directions corresponding to the radial direction and the tangential direction of the disc.

The servo-signal processing circuit 19 generates an RF signal, a focus error signal FE and a tracking error signal TE in accordance with the output signals from the 4-divisional light-receiving elements of the photodetector 45. These error signals are supplied to the controller 30.

Incidentally, the above embodiment carried out focus servo and tracking servo on the astigmatism method. However, this is not limitative and a well-known method such as a three-beam method may be employed.

As noted above, in the present embodiment, the reproduced signal detector 37 uses the image detection sensor, and a distortion corrector 50 is provided in front of the image detection sensor. The structure and operation of the distortion corrector 50 is described in detail below.

Figure 4:
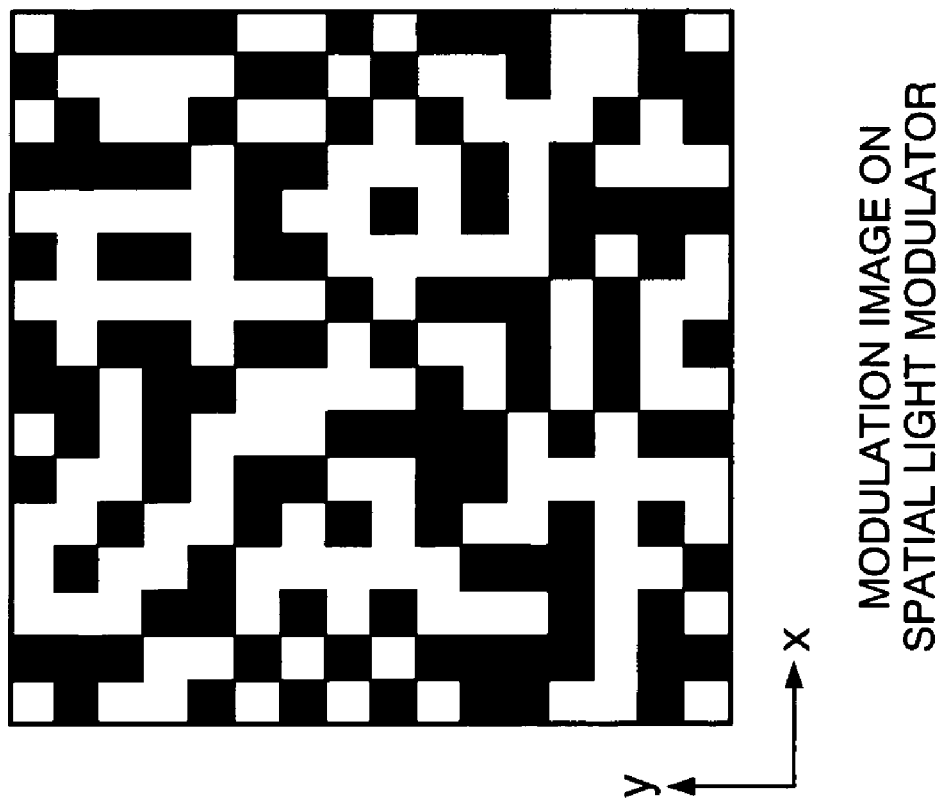
FIG. 4 is a plan view showing an example of a modulation pattern (modulation image) on the spatial light modulator in accordance with a data signal.
Figure 5:
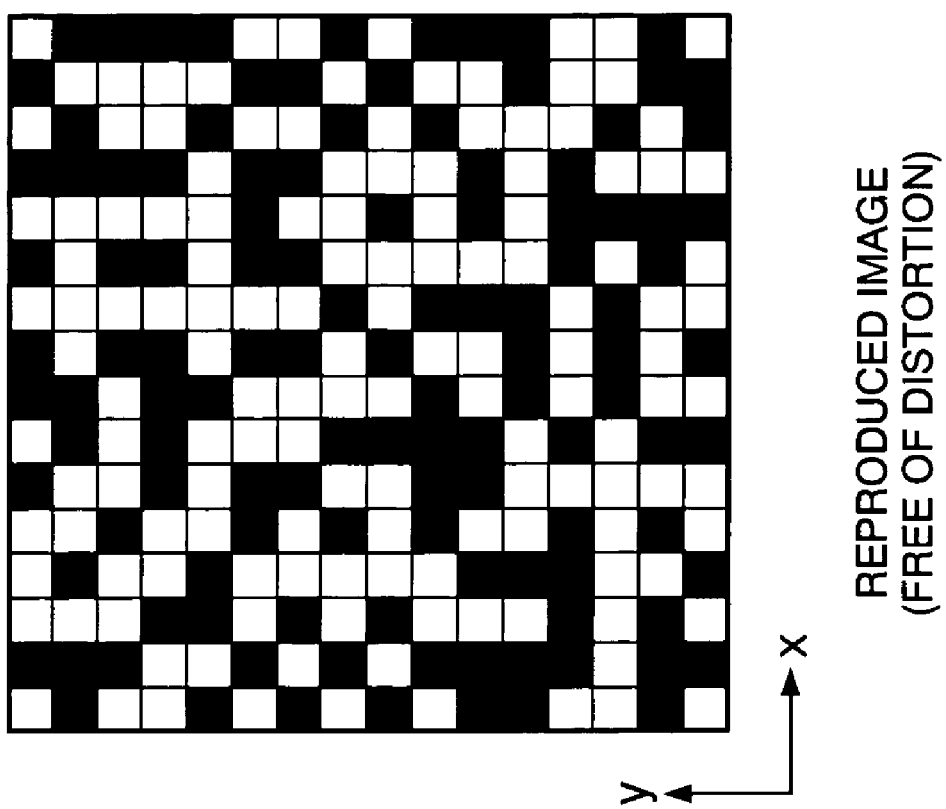

First, described is an image distortion which is caused due to contraction or expansion of a recording medium, or aberration of the optical system, with reference to the attached drawings. FIG. 4 is a plan view showing an example of a modulation pattern for the spatial light modulator 35 according to a data signal. FIG. 5 is a figure showing a reproduced image when the data is recorded on a recording medium with the modulation pattern shown in FIG. 4 and then reproduced in the absence of a warp, deformation or the like of the recording medium or the like. Namely, it shows an image pattern on the image detection sensor where a data signal is correctly recorded and reproduced.

Figure 6B:
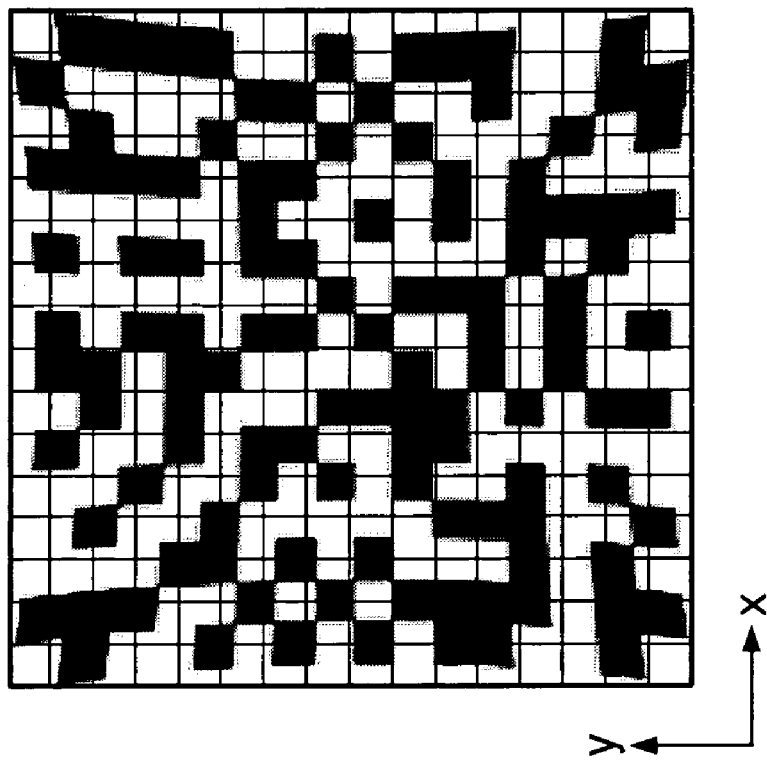
FIGS. 6A–6B are views showing an image pattern (reproduced image) on the image detection sensor when there is a barrel distortion and pincushion distortion of the reproduced image.
Figure 6A:
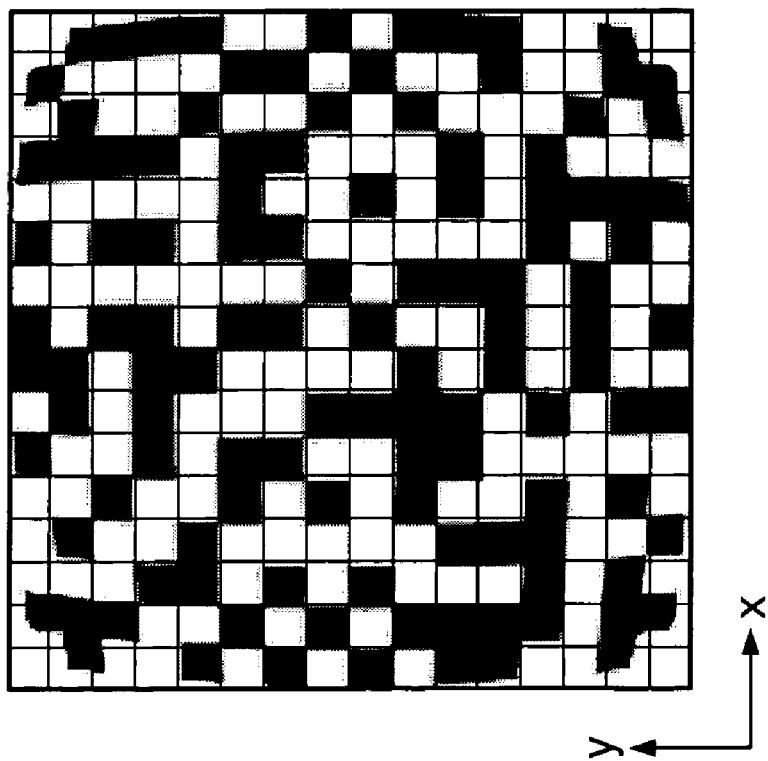

On the contrary, when there is a warp, deformation or the like of the recording medium or aberration of the optical system, a distortion occurs in a reproduced image. FIGS. 6A and 6B show image patterns (reproduced images) on the image detection sensor where there is a barrel distortion and a pincushion distortion of the respective reproduced images. More specifically, in the barrel distortion shown in FIG. 6A, the reproduced image is convexly distorted in the x direction. Meanwhile, in the pincushion distortion shown in FIG. 6B, the reproduced image is concavely distorted in the x and y directions.

[Distortion Corrector]

Figure 7:
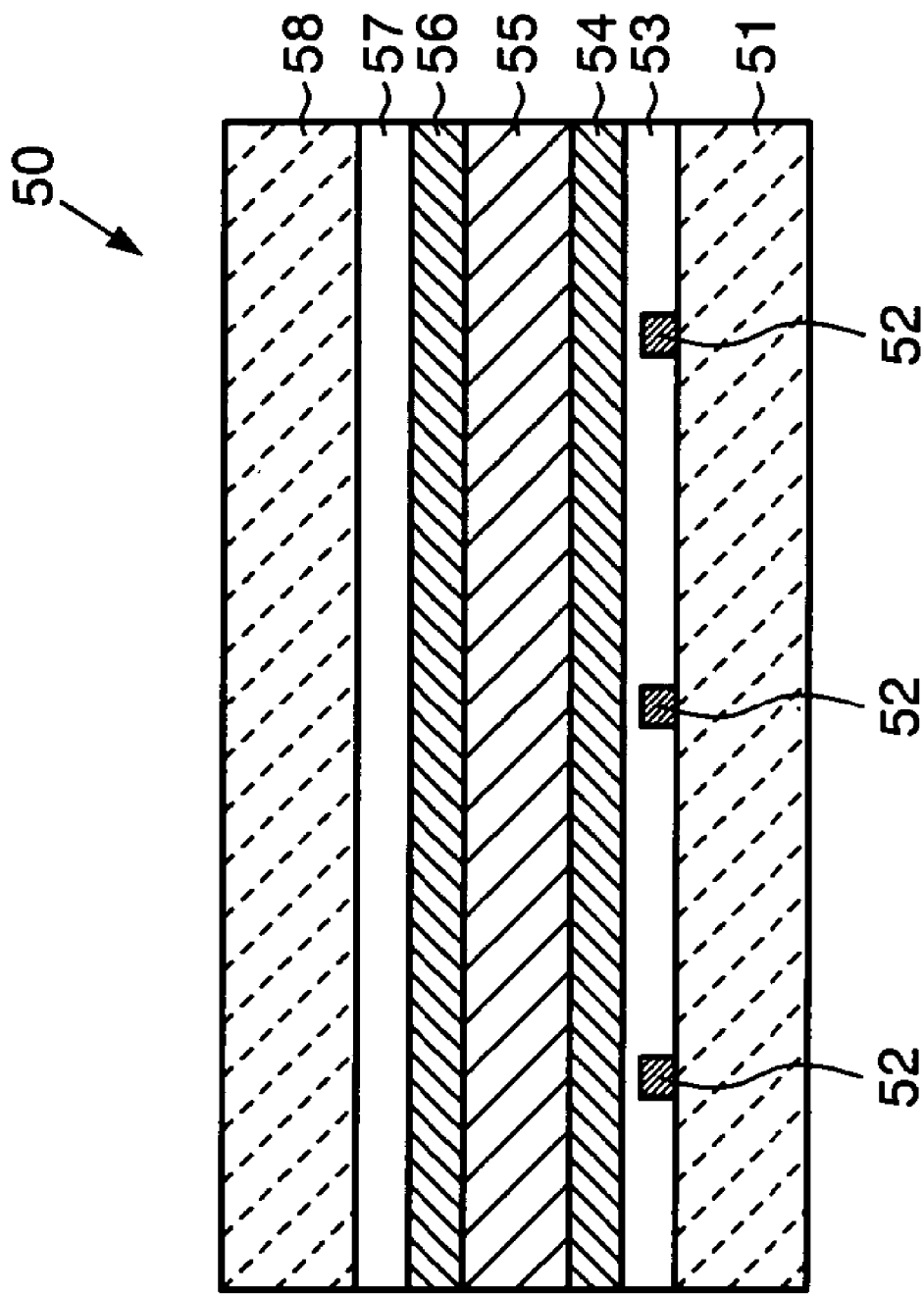
FIG. 7 is a sectional view showing a structure of a distortion corrector.

FIG. 7 is a sectional view showing a distortion corrector 50 for correcting barrel distortion. Meanwhile, FIG. 8 is a plan view schematically showing an electrode structure of the distortion corrector 50 (FIG. 7) corresponding to barrel distortion. Incidentally, FIG. 7 corresponds to a section on the line A—A in FIG. 8.

The distortion corrector 50 is similar in basic structure to the general aberration-correcting liquid-crystal element for use on an optical pickup in that having a liquid crystal and an electrode for applying electric field to the liquid crystal.

The distortion corrector 50 has a mechanism for changing the refractive index of liquid crystal by applying an electric field and providing a distributed phase difference (aberration) to the light beam, thereby correcting aberration.

As shown in FIG. 7, the distortion corrector 50 is structured by laying, on a glass substrate (1) 51, a transparent electrode 53 burying therein a low resistance electrode 52, an orientation film 54, a liquid crystal 55, an orientation film 56, a low resistance transparent electrode 57 and a glass substrate (2) 58 in this order. The transparent electrode 53 is formed of a material higher in resistance than the low resistance electrode 52. The low resistance electrode 52 is formed of a transparent electrode material, e.g. metal material or indium-tin oxide (ITO). In the below, description is on the assumption that the low resistance electrode 52 is formed of a metal material, i.e. metal electrode 52. When voltage is applied to the metal electrodes 52, voltage is uniformly applied to the metal electrodes 52. Meanwhile, because the transparent electrode 53 is higher in resistance than the metal electrode 52, a voltage drop occurs at between the metal electrodes 52. Because the voltage drop occurs in accordance with a resistance distribution of the transparent electrode 53, the electric field applied to the liquid crystal 55 is smooth in distribution. This can generate such a phase difference distribution (aberration) as to cancel the distortion caused in the reproduced light beam.

Meanwhile, the transparent electrode 53 and the low-resistance transparent electrode 57 are formed, for example, of indium-tin oxide (ITO) and transparent for a laser beam used. The orientation films 54, 56 are used to align the directions of the liquid crystal 55. It is sufficient that the low-resistance electrode 52 is formed so as to be electrically connected to the transparent electrode 53 without limited to the formation within the transparent electrode 53. Meanwhile, the transparent electrode, the metal electrode and the like can be formed by the usual evaporation, sputtering and so on.

As shown in FIG. 8, the metal electrode 52 of the distortion corrector 50 is configured by four semi-circular electrodes and an X-formed electrode having linear electrodes crossing and electrically connected together at its center. Because the transparent electrode 53 is higher in resistance than the metal electrode 52, the application of voltages (V1–V4 and Vc) respectively to these electrodes causes an electric field distribution in the liquid crystal 55 according to the application voltages. Accordingly, various forms of barrel distortions can be corrected by changing the application voltages to the metal electrodes 52.

FIG. 9A shows a phase difference distribution (aberration) caused when the metal electrode 52 is applied with voltages as V1=V2=V3=V4 (=Vs). The X-formed electrode is applied with a voltage Vc which is different in value from the voltage Vs (i.e. Vc≠Vs). FIG. 9B shows a phase difference distribution when application voltage are V1=V2=V3 and V4=Vc while FIG. 9C shows a phase difference distribution when application voltages are V1=V3 and V2=V4=Vc.

Figure 10:
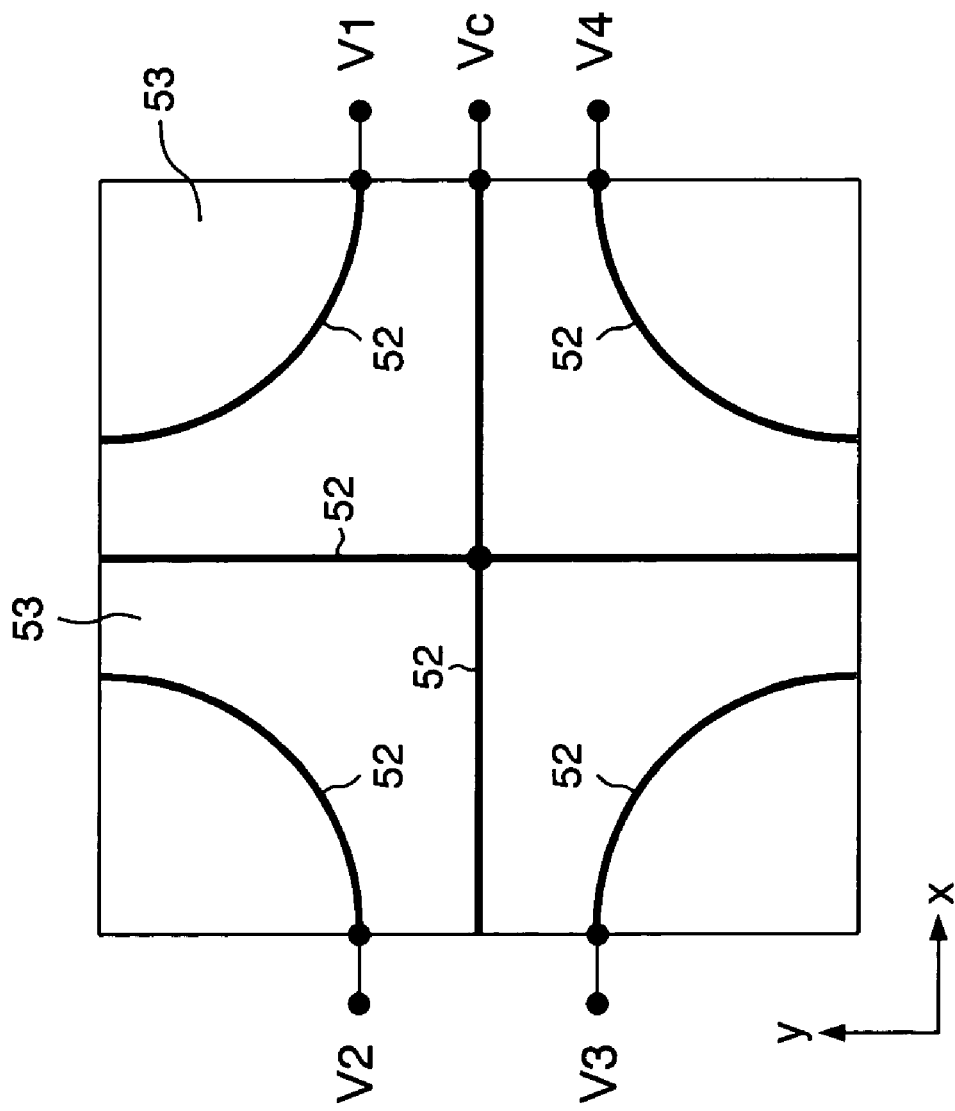
FIG. 10 is a plan view schematically showing an electrode structure of a distortion corrector for correcting pincushion distortion.

By changing the electrode pattern of the metal electrodes 52 of the distortion corrector 50 shown in FIG. 7, various forms of distortions can be corrected. FIG. 10 is a plan view schematically showing an electrode structure of the distortion corrector 50 for correcting pincushion distortion. More specifically, the metal electrode 52 is configured by four quadrant-formed electrodes and an electrode having linear electrodes crossing and electrically connected together at its center.

FIG. 11A shows a phase difference distribution caused when the quadrant-formed electrodes are applied with voltages as V1=V2=V3=V4 (=Vs). The linear electrode is applied with a voltage Vc (i.e. Vc≠Vs) different in value from those. FIG. 11B shows a phase difference distribution when application voltage is V1=V2=V3 and V4=Vc while FIG. 11C shows that when application voltage is V2=V3 and V1=V4=Vc.

Furthermore, by changing the electrode pattern of the metal electrodes 52, it is possible to form a distortion corrector 50 capable of coping with trapezoidal distortion, for example. FIG. 12 is a plan view schematically showing an electrode structure of the distortion corrector 50 for correcting trapezoidal distortion. More specifically, the metal electrode 52 has two linear electrodes (application voltages V1, V2) arranged corresponding to trapezoid and a linear electrode (application voltage Vc) centrally arranged between those.

Figure 13B:
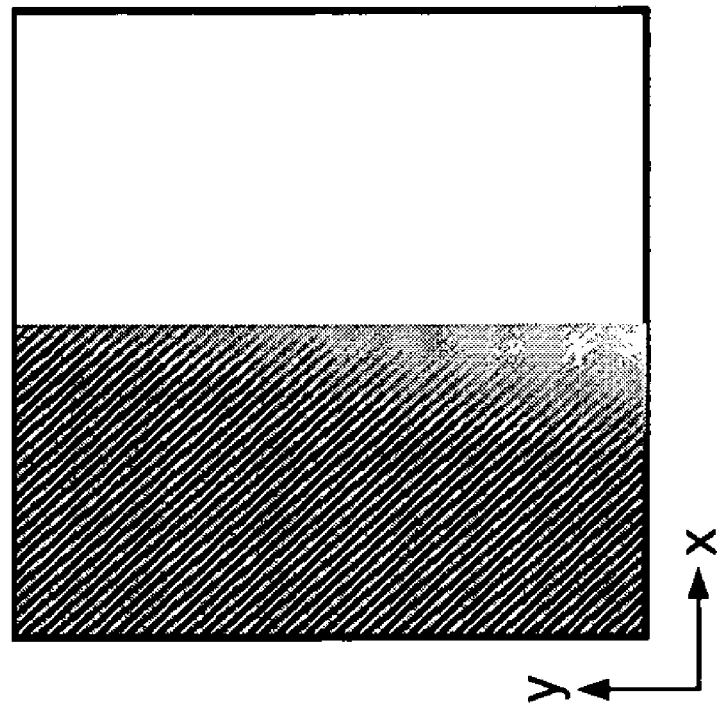
FIGS. 13A and 13B are plan views schematically showing phase difference distributions caused in applying various voltages to the metal electrodes of the distortion corrector shown in FIG. 12.
Figure 13A:
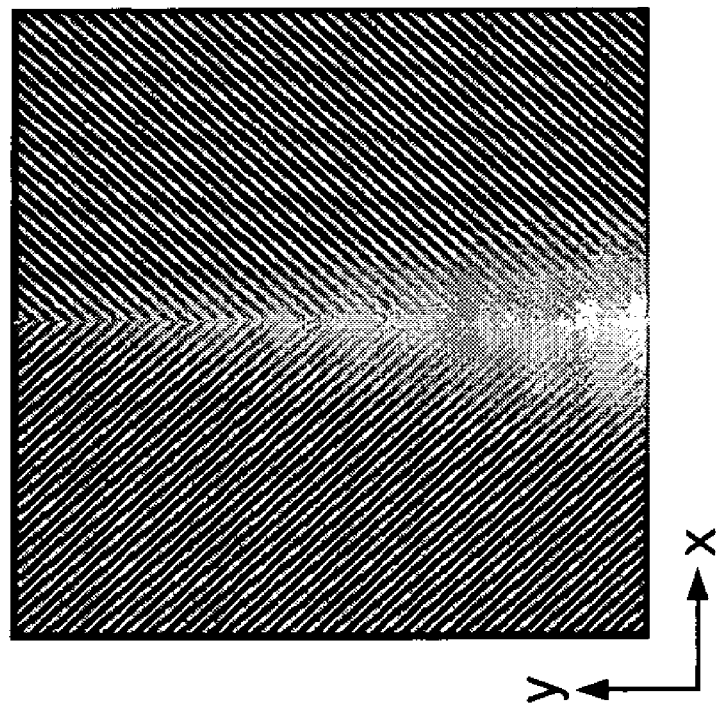

FIG. 13A shows a phase difference distribution caused when the two linear electrodes are applied with voltages as V1=V2 (=Vs). The linear electrode is applied with a voltage Vc which is different in value from the voltage Vs (i.e. Vc≠Vs). FIG. 13B shows a phase difference distribution when the application voltage is V2=Vc.

Incidentally, the above embodiment described the case where the electrode on one side of the liquid crystal 55 is formed by the transparent electrode 53 and the low-resistance electrode 52 while the other side electrode opposed to the one side electrode is formed by the low-resistance transparent electrode 57. Namely, the low-resistance electrodes (e.g. metal electrodes) 52 are arranged in a form corresponding to a predetermined form (or predetermined mode) of distortion. The one side electrode is structured to generate a phase difference distribution such that the predetermined form of distortion is canceled by adjusting the application voltage. However, the one and the other side electrodes are not limited to the structure shown in the above embodiments. In brief, it is satisfactory to have electrodes divided to apply, to the liquid crystal, an electric field corresponding to a predetermined form of distortion. Namely, they are satisfactorily configured such that a predetermined form of distortion can be corrected by application of voltage to the electrode.

[Detection and Correction of Distortion]

Description is now made on the structure for detecting and correcting various distortions as mentioned above. In order to detect a distortion in a reproduced image, a part of an image region (data region) is set as a mark region where the highest detection sensitivity is considered to be obtained in accordance with a pattern of distortion.

FIG. 14 shows an image which represents page data, and illustrating a mark region and mark data to be set in correcting barrel distortion. More specifically, there are settings of mark regions 61A, 61B, 61C, 61D where predetermined ones of pixel data for detection (mark data) are arranged at four corners of a rectangular image region 60. Note that, in the figure, the mark region is shown surrounded by the broken lines. Of the image region 60, the other region than the mark regions 61A, 61B, 61C, 61D can be used to record data which carries to-be-recorded information, referred later. In the figure, shown is one example of an image corresponding to information data.

Here, those of mark data to be arranged in the relevant mark regions also use the same references 61A, 61B, 61C, 61D, for convenience of explanation. The other region than the mark regions is a data effective region usable for recording/reproducing information data.

Specifically, for the other region than the mark regions, desired dummy data may be employed in place of to-be-recorded information data. Meanwhile, page data exclusive for distortion detection may be used instead of including any piece of information data in the region other than the mark regions (i.e. equivalent to including vacant dummy data) Meanwhile, pixel data for detection (i.e. mark data) may be included in all of data pages or inserted at an interval of predetermined number of data pages.

The pixel data for detection (i.e., mark data) is recorded by superimposition over the data to be recorded, i.e. over the information data during modulation by the spatial light modulator 35. Here, information data refers to character data, image data or any other of data carrying information. In this manner, the data recorded including mark data is reproduced. When the mark data is detected to be deviated in position from a pixel to be detected by the image detection sensor of the reproduced signal detector 37, a distortion size, form and the like of the reproduced image can be determined by the deviation.

More specifically, the distortion detection setting section 30A of the controller 30 is to set a mark region and mark data in accordance with a distortion to be detected. Then, the controller 30 performs an encode processing on the to-be-recorded information data and generates a modulation data signal (hereinafter, also simply referred to as "modulation signal") by including the foregoing mark data 61A, 61B, 61C, 61D in the processed data, thereby supplying the modulation data signal to the spatial-light-modulator drive circuit 17. The spatial-light-modulator drive circuit 17 causes the spatial light modulator (SLM) 35 to perform modulation according to the modulation data signal, thus implementing a recording.

Figure 15:
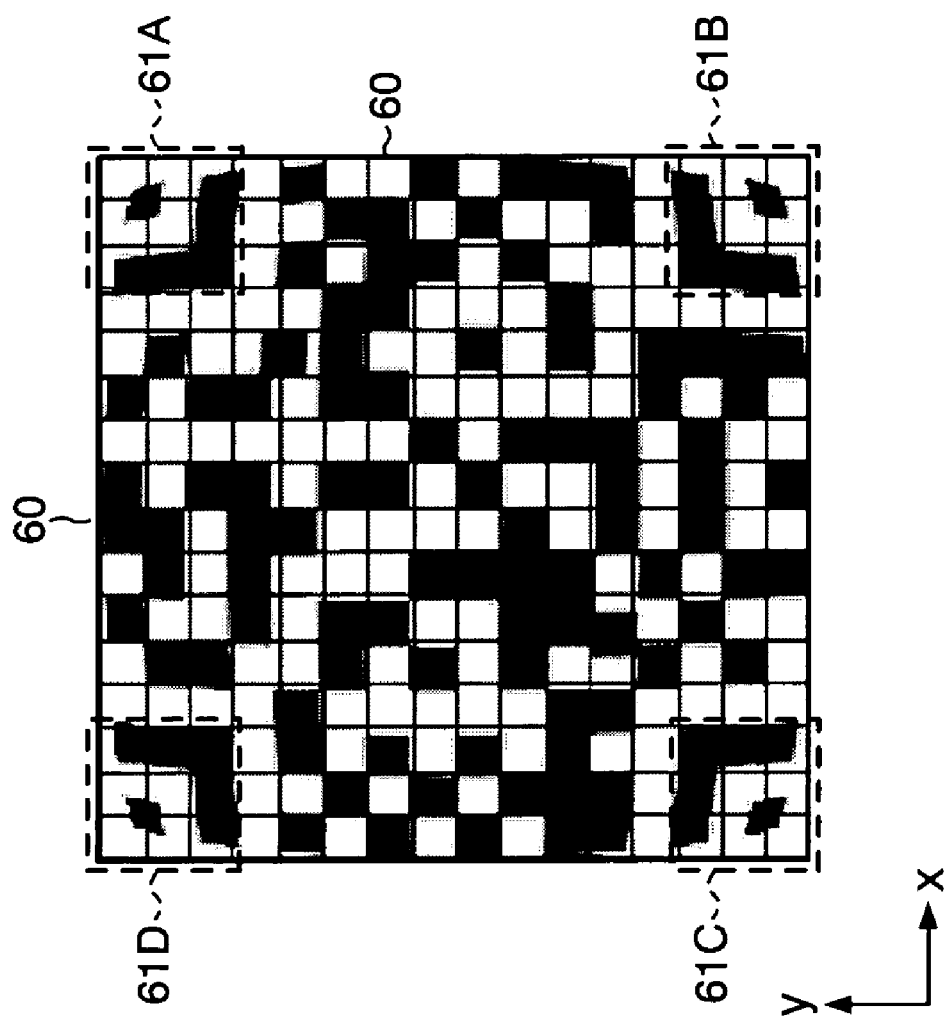
FIG. 15 is a plan view showing a reproduced image on the image detection sensor in the presence of barrel distortion.

FIG. 15 shows a reproduced image on the reproduced signal detector 37 in the presence of a barrel distortion as described above. It can be seen that, within the mark region 61A, 61B, 61C, 61D arranged at the four corners of the image region 60, the mark data image is deviated from the proper pixel position. There is also shown that such image-to-pixel deviation is remarkable in the mark regions 61A–61D. Incidentally, although the mark regions 61A–61D are shown on the case each comprises 3 pixels by 3 pixels, for convenience of explanation, it is satisfactory to suitably define a required number of mark regions, a region form and the number of pixels.

In reproducing, the reproduced signal from the reproduced signal detector 37 is processed by the reproduced-signal detection processing circuit 20 and forwarded to the controller 30. The distortion detecting circuit 21 detects a distortion on the basis of the reproduced signal from the reproduced-signal detection processing circuit 20 and supplies a distortion detection signal to the controller 30. Namely, the distortion detecting circuit 21 detects a deviation of the mark data image in each mark region of the reproduced image and detects a distortion of the reproduced image from the deviation.

The controller 30 generates a distortion correcting signal designating a voltage to be applied to the distortion corrector (CR) 50 depending on a distortion detection signal and supplies it to the distortion corrector drive circuit 18. Incidentally, the distortion corrector (CR) 50 of the embodiment has an electrode structure shown in FIG. 8 corresponding to barrel distortion. The distortion corrector drive circuit 18 drives the distortion corrector (CR) 50 in response to the distortion correcting signal. Although correction control is effected by the procedure, the controller 30 preferably repeats the correction control until the distortion becomes within a predetermined range. Namely, in this case, those circuits in the above are configured as a servo control circuit for distortion correction.

Figure 16:
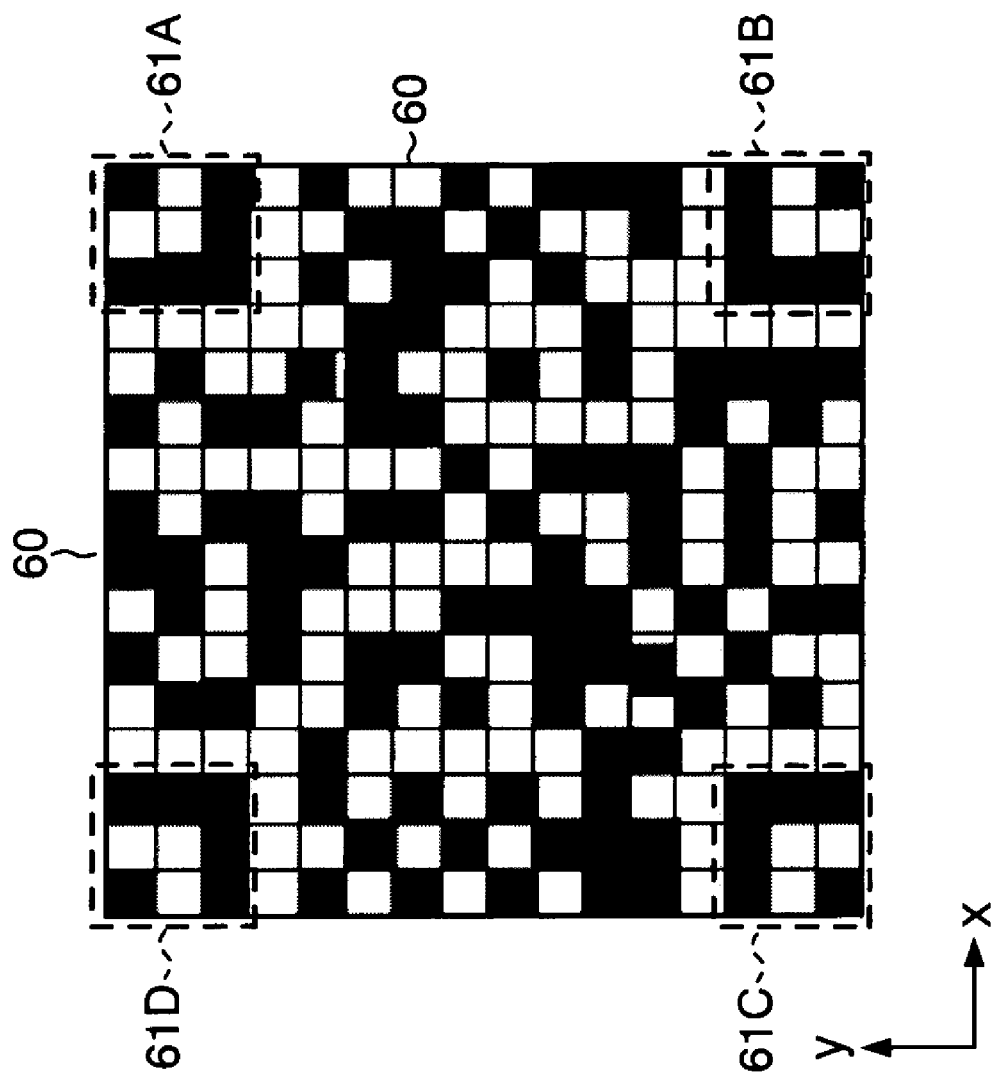
FIG. 16 is a plan view showing a reproduced image on the image detection sensor after the barrel distortion shown in FIG. 15 has been corrected.

FIG. 16 shows a post-correction-control reproduced image on the reproduced signal detector 37. By correcting the distortion, there is obtained a distortion-free image corresponding to the modulation data in recording shown in FIG. 14.

The controller 30 performs a processing of demodulation and error-correction on the basis of the signal from the reproduced-signal detection processing circuit 20, thereby restoring the data recorded in the hologram disc 11. Furthermore, the controller 30 performs a decode processing on the restored data to thereby reproduce information data and outputs it as reproduction information data. Incidentally, the recording, reproducing and distortion correction in the above are carried out under control of the controller 30.

As described above, it is possible to perform a correction of a distortion on the photodetector that could not be corrected on the conventional aberration corrector. Thus, data recorded can be reproduced with correctness and high accuracy.

Meanwhile, for the distortion detection in the above, it is satisfactory to perform an image processing or the like only on the data in the mark regions. Accordingly, detection (image processing, etc.) is easy to carry out wherein the processing thereof can be with accuracy and at high speed. Furthermore, because the mark regions are provided at positions where distortion detection can be performed with high accuracy, detection process is accurate and easy to be carried out.

SECOND EMBODIMENT

Although the first embodiment described the case to correct barrel distortion, description is now made on a case where the foregoing distortion correction is applied to the other types of distortions.

Figure 17:
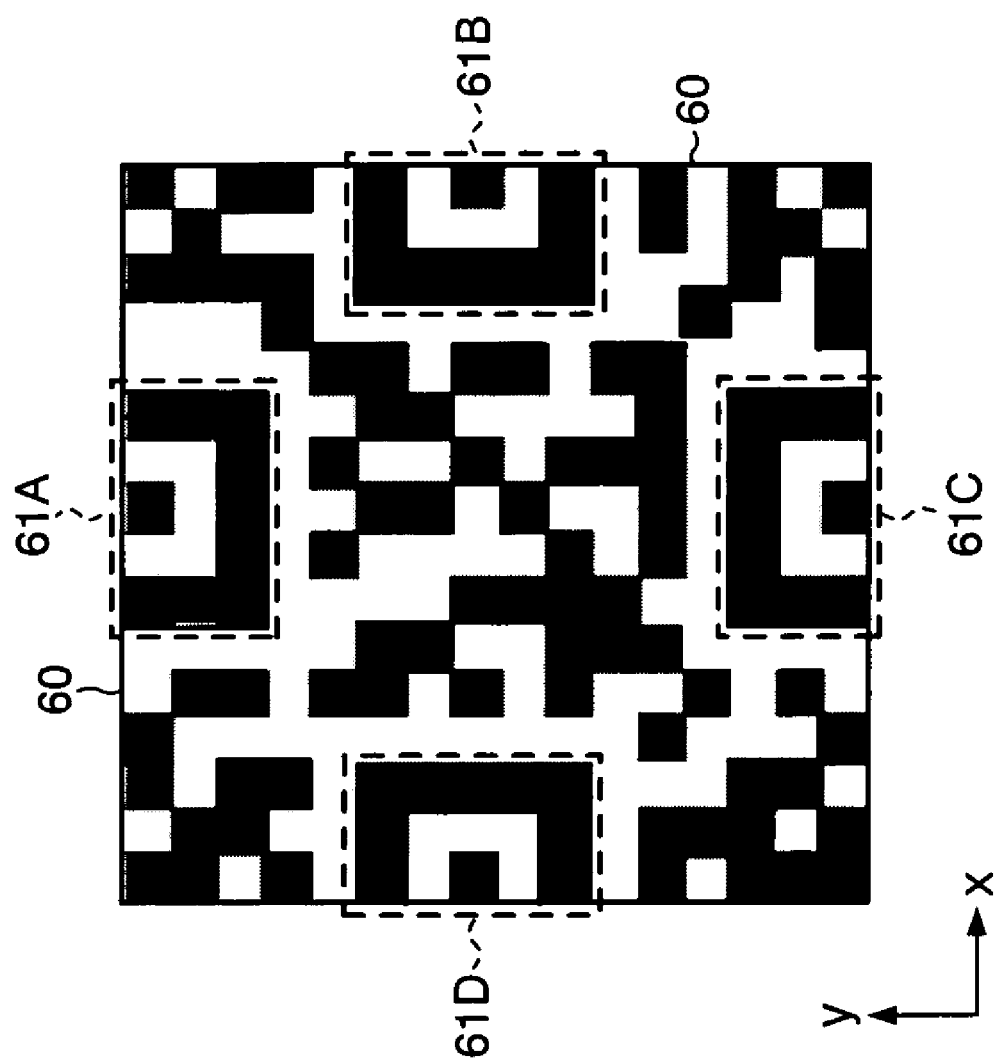
FIG. 17 is a plan view showing mark regions (broken lines) and mark data to be set in correcting pincushion distortion.

FIG. 17 shows a mark region and mark data to be set when correcting pincushion distortion. There are settings of mark regions 61A, 61B, 61C, 61D where predetermined ones of mark data are arranged centrally on the four sides of a rectangular image region 60. Namely, a part of an image region (data region) is set as a mark region where the highest detection sensitivity is considered to be obtained in accordance with a pattern of distortion. Incidentally, in the figure, this is similar to the first embodiment in that the relevant mark region is shown surrounded by the broken lines.

This is similar to the first embodiment in that the mark data 61A, 61B, 61C, 61D is superimposed on the information data so that modulation can be made on the spatial light modulator 35 in accordance with the obtained modulation data signal thereby effecting recording onto the recording medium.

Figure 18:
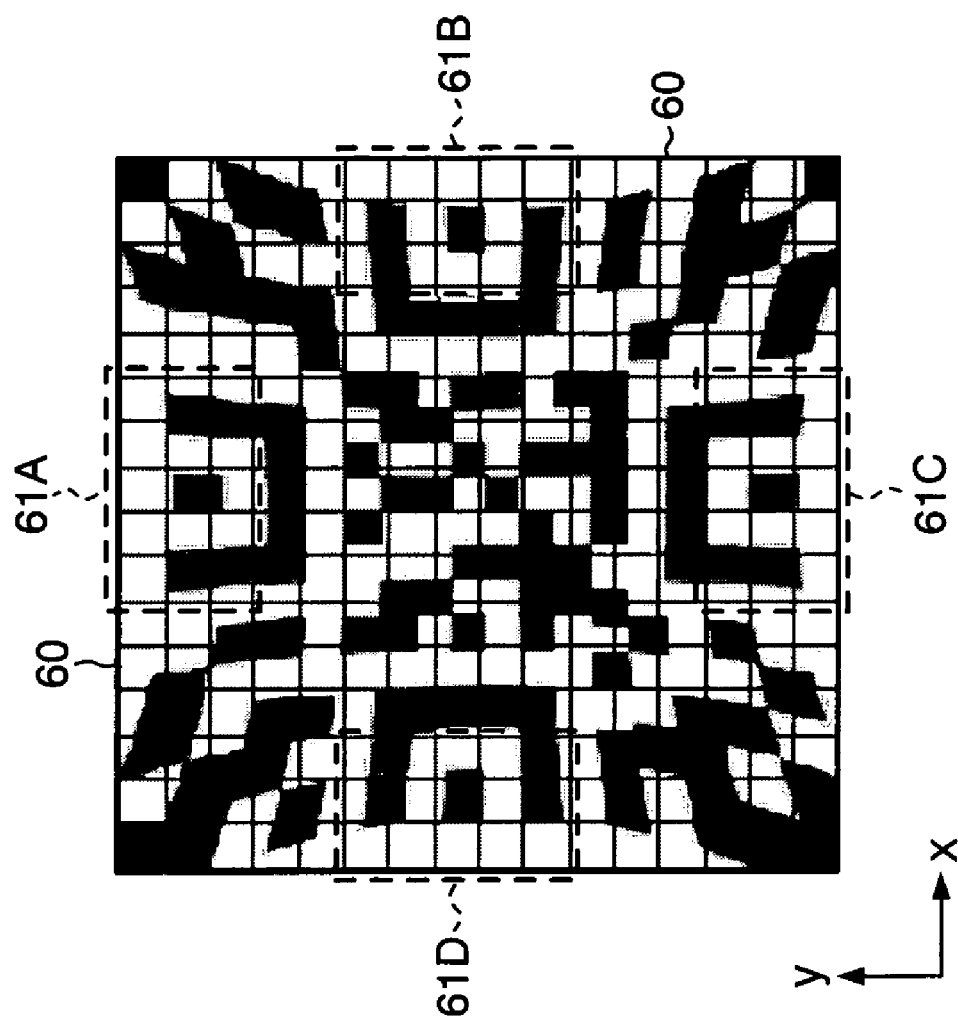
FIG. 18 is a plan view showing a reproduced image on the image detection sensor in the presence of pincushion distortion.

FIG. 18 shows a reproduced image on the reproduced signal detector 37 in the presence of a pincushion distortion as noted above. It can be seen that, within the mark region 61A, 61B, 61C, 61D, the mark data image is largely deviated from the pixel position. There is also shown that such image-to-pixel deviation is remarkable in the mark regions 61A–61D. Incidentally, although there was shown the case that the mark region 61A, 61C comprises 5 pixels (in x direction) by 3 pixels (in y direction) while the mark region 61B, 61D comprises 3 pixels (in x direction) by 5 pixels (in y direction), it is satisfactory to suitably define a required number of mark regions, a region form and the number of pixels.

In reproducing, servo control for distortion correction is carried out under control of the controller 30, similarly to the first embodiment. Incidentally, the distortion corrector (CR) 50 of this embodiment has an electrode structure (FIG. 10) corresponding to pincushion distortion.

By carrying out correction control as in the above, a favorable distortion-free reproduced image is obtained on the reproduced signal detector 37, as shown in FIG. 19. Thus, recorded data can be read out with correctness.

Figure 20A:
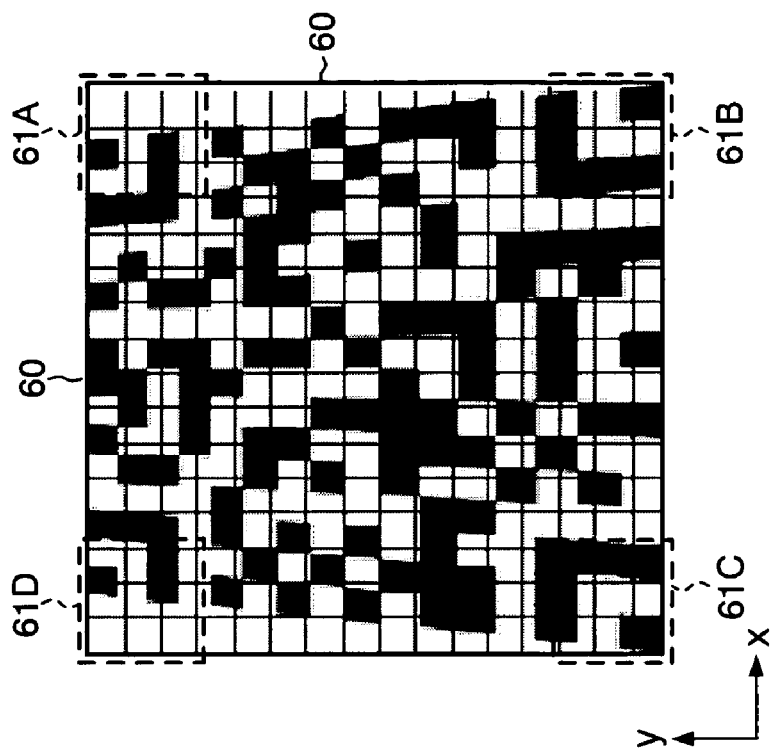
FIGS. 20A and 20B are a plan view showing mark regions (broken lines) and mark data to be set in correcting trapezoidal distortion, and a plan view showing a reproduced image on the image detection sensor in the presence of trapezoidal distortion.

Furthermore, an application is possible for correcting trapezoidal distortion. FIG. 20A shows a mark region and mark data to be set in correcting trapezoidal distortion. There are settings of mark regions 61A, 61B, 61C, 61D where predetermined ones of mark data are arranged at four corners of a rectangular image region 60, in a similar manner for correcting barrel distortion.

This is similar to the first embodiment in that the mark data 61A, 61B, 61C, 61D is superimposed on the information data so that modulation can be made on the spatial light modulator 35 in accordance with the obtained modulation data signal thereby effecting recording onto the recording medium.

Figure 20B:
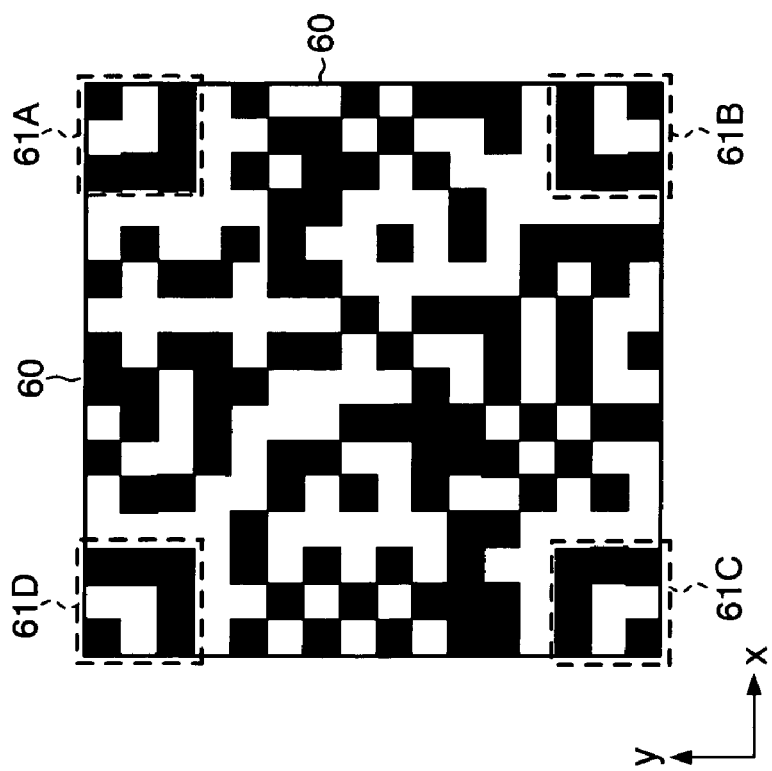

FIG. 20B shows a reproduced image on the reproduced signal detector 37 in the presence of a trapezoidal distortion. It can be seen that, within the mark region 61A, 61B, 61C, 61D, the mark data image is largely deviated from the pixel position. Incidentally, it is satisfactory to suitably define a required number of mark regions, a region form and the number of pixels, similarly to the foregoing embodiment.

In reproducing, servo control for distortion correction is carried out under control of the controller 30, similarly to the foregoing embodiments. Incidentally, the distortion corrector (CR) 50 of this embodiment has an electrode structure (FIG. 12) corresponding to trapezoidal distortion.

When carrying out correction control, a favorable reproduced image free of distortion is obtained on the reproduced signal detector 37, similarly to the showing in FIGS. 16 and 19. Thus, recorded data can be read out with correctness.

Furthermore, application is possible in correcting one-sided distortion that has a distortion in a one-sided half of the image region 60. FIG. 21A shows a mark region and mark data to be set in correcting a one-sided barrel distortion that has a distortion at one side (at left in this figure) of the image region 60. There are settings of mark regions 61A, 61B, 61C, 61D where predetermined ones of mark data are arranged at four corners of a rectangular image region 60, similarly to correcting barrel distortion.

This is similar to the foregoing embodiments in that the mark data 61A, 61B, 61C, 61D is superimposed on the information data so that modulation can be made on the spatial light modulator 35 in accordance with the obtained modulation data signal thereby effecting recording onto the recording medium.

FIG. 21B shows a reproduced image on the reproduced signal detector 37 in the presence of a one-sided barrel distortion. It can be seen that, within the two mark regions 61C, 61D, the mark data image is largely deviated from the pixel position.

In reproducing, servo control for distortion correction is carried out under control of the controller 30, similarly to the foregoing embodiment. Incidentally, the distortion corrector (CR) 50 of this embodiment has an electrode structure (FIG. 12) corresponding to trapezoidal distortion.

In the case of carrying out correction control, a favorable reproduced image free of distortion is obtained on the reproduced signal detector 37, similarly to the showing in FIGS. 16 and 19. Thus, recorded data can be read out with correctness.

THIRD EMBODIMENT

The distortion corrector 50 having the above or other electrode structure can be used alone or in combination of a plurality thereof. FIG. 22 shows a structure for correcting combined distortion, wherein the distortion corrector 50 is made up by a combination of a distortion corrector 50A for pincushion distortion, a distortion corrector 50B for barrel distortion and a distortion corrector 50C for trapezoidal distortion.

In reproducing, the controller 30 calculates an application voltages to the distortion corrector 50 on the basis of a distortion detection signal from the distortion detecting circuit 21. More specifically, the controller 30 analyzes the contributions of pincushion distortion, barrel distortion and trapezoidal distortion, for example, in the detected distortion and then determines application voltages to the distortion corrector 50A, 50B, 50C. The controller 30 generates a distortion-correction control signal designating the relevant application voltage and controls the distortion-corrector drive circuit 18. The controller 30 repeats the above correction control until the distortion becomes within a predetermined range.

Incidentally, although the first to third embodiments described the case that distortion correction control is carried out during reproduction, distortion correction control may be carried out when performing recording. Otherwise, distortion correction control may be both carried out in recording and in reproducing.

In the case of making a distortion correction control during recording, the mark data only is test-recorded in a test-recording region of the recording medium. By reproducing the recorded data, distortion correction control can be carried out. By making a recording after such distortion correction control, a favorable reproduced image free of distortion can be obtained during reproduction. Thus, recorded data can be read out with correctness.

FOURTH EMBODIMENT

Figure 23:
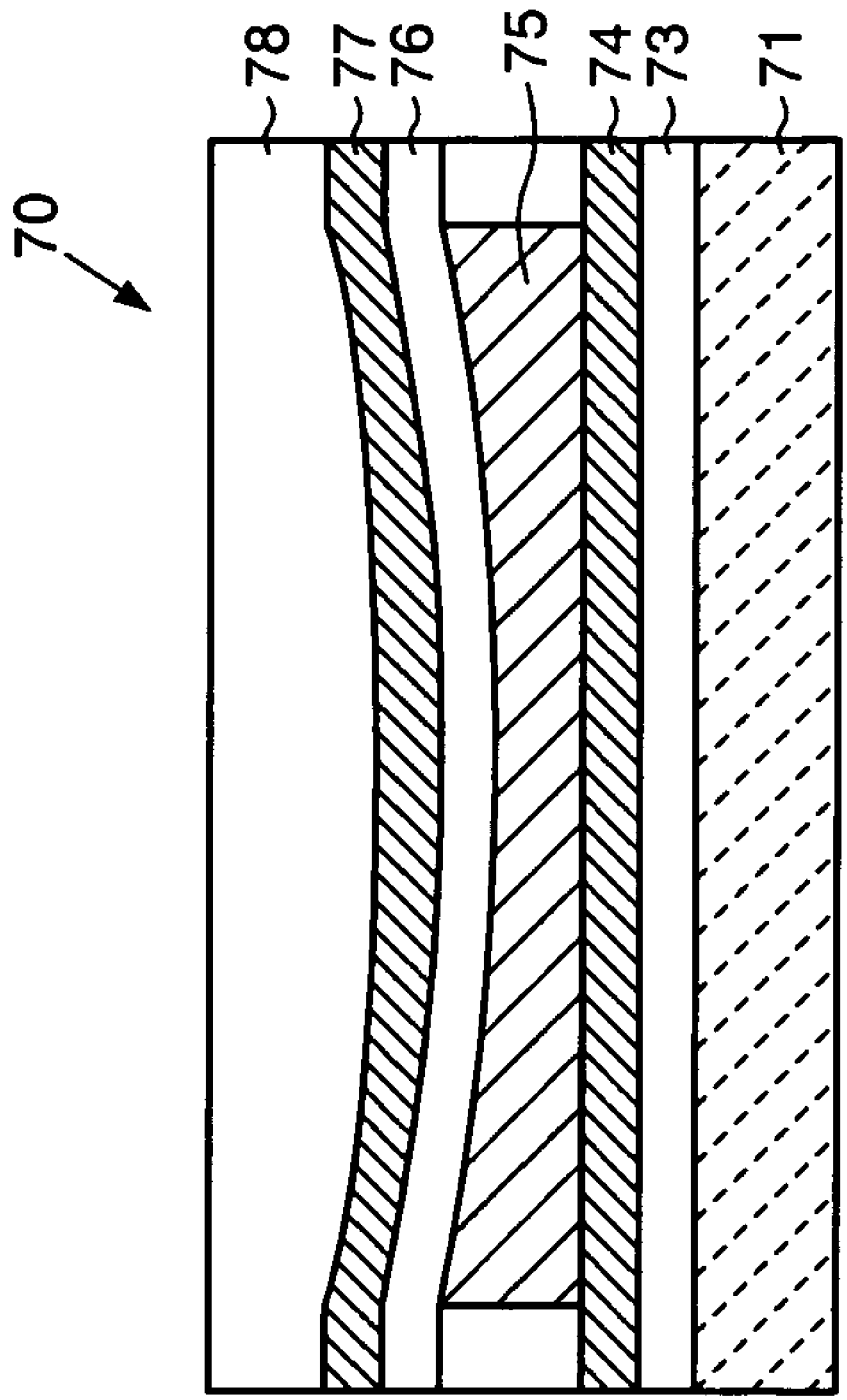
FIG. 23 is a sectional view schematically showing a structure of a distortion corrector for correcting barrel distortion, according to a fourth embodiment of the present invention, wherein used is a liquid crystal in a lens shape corresponding to a shape of distortion.

FIG. 23 is a sectional view showing a structure of a distortion corrector 70 for correction of barrel distortion according to a fourth embodiment of the present invention. This is different from the distortion corrector 50 (e.g. FIG. 7) of the foregoing embodiments in that using a liquid crystal having a lens form corresponding to a form or shape of distortion.

More specifically, as shown in FIG. 23, the distortion corrector 70 is configured by laying, on a glass substrate (1) 71, a transparent electrode 73, an orientation film 74, a liquid crystal 75 in a lens form, an orientation film 76, a low resistance transparent electrode 77 and a glass substrate (2) 78 in this order. Because the liquid crystal 75 corresponds to the form of distortion to be corrected (e.g. barrel type), the transparent electrode 73 is not provided therein with a metal electrode differently from the distortion corrector 50 of the foregoing embodiments. The transparent electrode 73 is formed of a low-resistant transparent material.

In the embodiment using the distortion corrector 50, application voltage is changed to the metal electrode provided within the transparent electrode 53 so that distortion correction control is made by adjusting the distributed phase difference to be provided by the liquid crystal to a light beam. According to the structure of this embodiment, distortion correction control can be easily carried out without the need of such adjustment of an application voltage. Namely, in the distortion correction control of this embodiment, distortion correction control can be made by adjusting the application voltage to the transparent electrode 73 and transparent electrode 77.

As described in detail above, by the above distortion correction control, a favorable reproduced image free of distortion can be obtained on the reproduced signal detector 37. Thus, recorded data can be read out correctly.

For distortion detection, it is satisfactory to perform an image processing or the like only on the data in the mark regions. Accordingly, detection (image processing, etc.) is easy to carry out wherein the processing thereof can be with accuracy and at high speed. Furthermore, because the mark regions are provided at positions at which distortion detection accuracy is high, detection process is accurate and easy to carry out.

FIFTH EMBODIMENT

Figure 24:
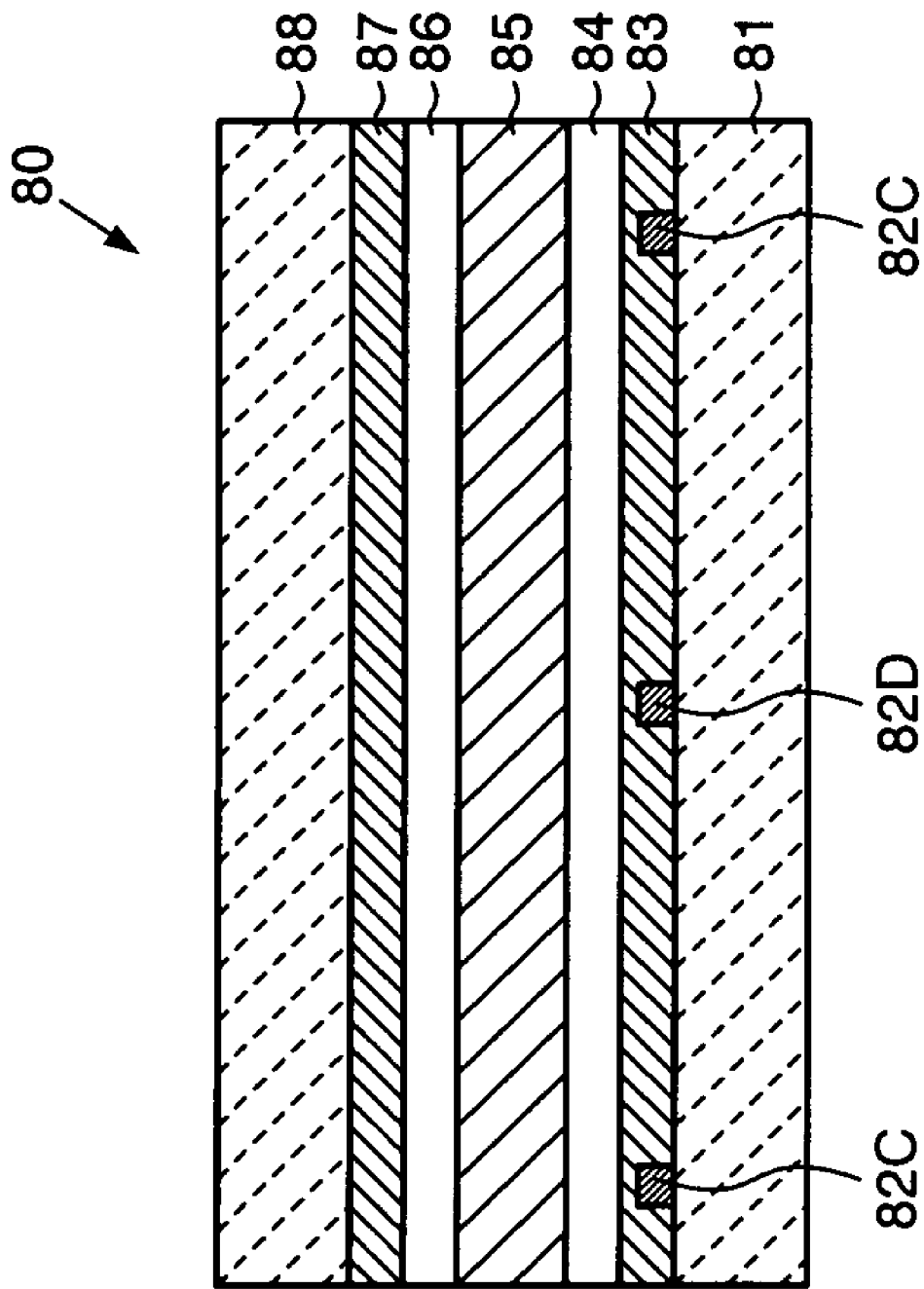
FIG. 24 is a sectional view showing a structure of a corrector for defocus correction according to a fifth embodiment of the invention.
Figure 25:
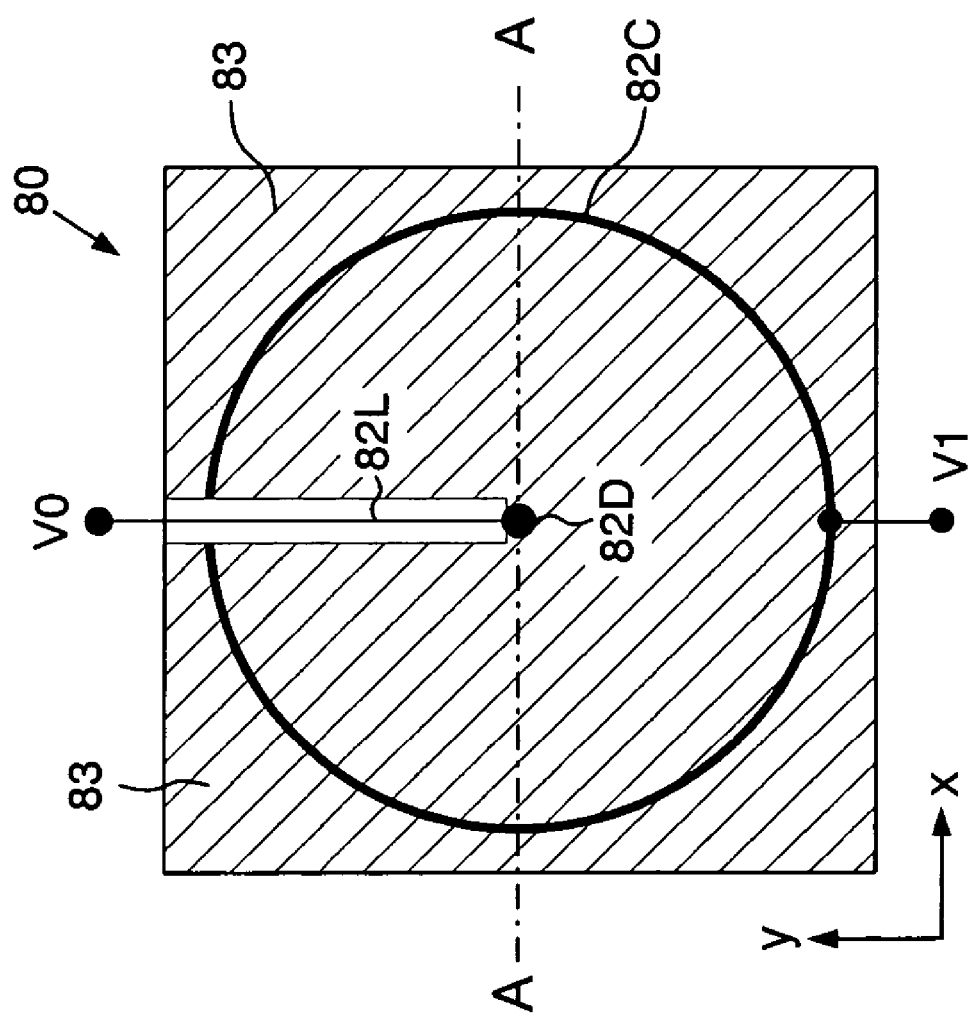
FIG. 25 is a plan view schematically showing an electrode structure of a defocus corrector shown in FIG. 24.

FIG. 24 is a sectional view showing a structure of a distortion corrector 80 for defocus correction according to a fifth embodiment of the invention. Meanwhile, FIG. 25 is a plan view schematically showing an electrode structure of the defocus corrector 80 shown in FIG. 24. Note that the sectional view in FIG. 24 illustrates a section on line A—A in FIG. 25.

The foregoing embodiment described the correction for a distortion of the hologram image caused due to contraction, expansion, etc. of the recording medium or the like. More specifically, description was made on the distortion that the hologram image was deformed into pincushion or barrel form. However, there are cases that defocus (or defocusing) or positional deviation takes place not only due to contraction, expansion, etc. of the recording medium or the like but also due to the optical system. Here, such irregular or unfavorable states as defocus, positional deviation, etc. of the hologram image are also defined as "distortion".

The present embodiment describes a case for correcting a defocus occurring in the hologram image.

As shown in FIG. 24, the distortion corrector 80 is configured such that there are stacked, on a glass substrate (1) 81, a transparent electrode 83 with low-resistance electrodes 82C, 82D buried therein, an orientation film 84, a liquid crystal 85, an orientation film 86, a low-resistance electrode 87 and a glass electrode (2) 88 one over another in this order. The transparent electrodes 82C, 82D are formed of a material higher in electric resistance than the low-resistance electrode 82. The low-resistance electrodes 82C, 82D are formed of a transparent electrode material, e.g. a metal material or an indium-tin oxide (ITO). In the following description, the low-resistance electrodes 82C, 82D are explained to be formed of a metal material, i.e. metal electrodes 82C, 82D.

Meanwhile, the transparent electrode 83 and the low-resistance transparent electrode 87 are formed, for example, of indium-tin oxide (ITO) to be transparent for a laser beam to be used. The orientation films 84, 86 are used to align the liquid crystal 85 of the crystal orientation. Incidentally, the low-resistance electrode 82 is satisfactorily formed in electrical connection with the transparent electrode 83 without limited to the formation within the transparent electrode 83. Meanwhile, the transparent electrodes, metal electrodes, etc. can be formed by the usual method of evaporation, sputtering or the like.

As shown in a plan view of FIG. 25, the distortion corrector 80 is provided with a circular electrode 82C low in electric resistance and a low-resistance electrode 82D in a dot form (or small circle) formed at the center of the circular electrode 82C. The low-resistance electrode 82D is connected with a lead electrode 82L. Note that the ITO electrode 83 (shown with hatching in the figure) is not formed in the neighborhood of the lead electrode 82L, i.e. the lead electrode 82L is not in direct contact with the transparent electrode 83.

Consequently, when voltages are applied to the metal electrodes 82C, 82D, the applied voltage is uniform in the metal electrodes 82C, 82D. Meanwhile, the transparent electrode 83 is formed higher in electric resistance than the metal electrodes 82C, 82D, hence generating a voltage drop between the metal electrodes 82C and 82D. Because the voltage drop occurs in accordance with the resistance distribution over the transparent electrode 83, the electric field applied to the liquid crystal 85 is smooth in distribution. This can create such a phase difference distribution (aberration) as to cancel the distortion (defocus) caused in the reproduced beam.

As discussed above, because the transparent electrode 83 is higher in electric resistance than the metal electrodes 82C, 82D, a concentric electric field distribution is caused in the liquid crystal 85 in accordance with the application voltage voltages $V_1$, $V_0$ respectively to these electrodes. Meanwhile, the gradient in the electric field distribution can be varied by changing the voltages $V_1$, $V_0$ (or potential difference between the metal electrodes 82C, 82D). Therefore, defocus can be corrected by changing the application voltages to the metal electrodes 82C, 82D.

Incidentally, in this embodiment, the structure and operation of defocus detection is similar to that of the foregoing embodiments. Namely, the mark region and mark data shown in the foregoing embodiments can be used in detecting defocus in a reproduced image. For example, a mark region and mark data can be used which is set in correcting a barrel or pincushion distortion.

Meanwhile, the operations of mark data recording, distortion (defocus) detection from the reproduced signal, defocus correction control, etc. can be carried out similarly to the foregoing embodiments. Namely, such pixel data (mark data) for detection is recorded by being superposed with recording data, or information data to be recorded, during modulation by the spatial modulator 35.

Figure 26:
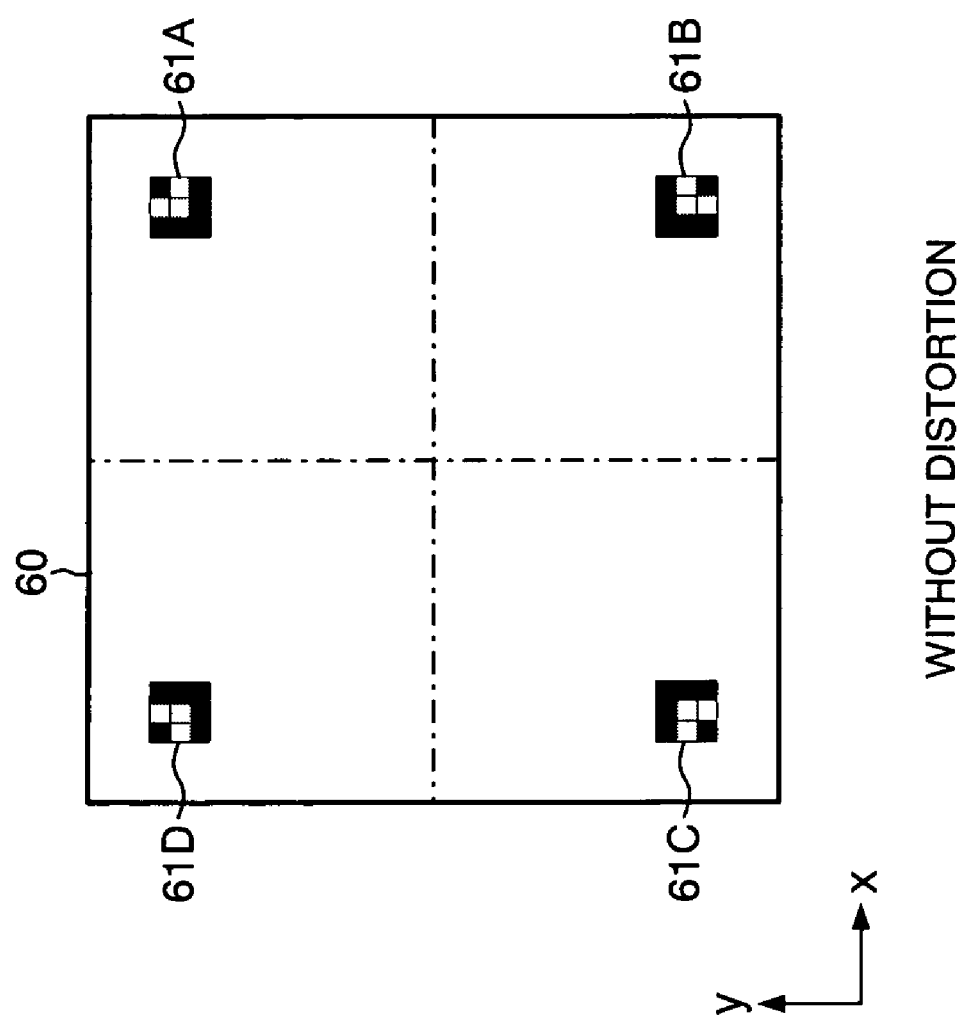
FIG. 26 is a view schematically showing the positions of mark data 61A–61D in the absence of a distortion of the reproduced image.
Figure 27:
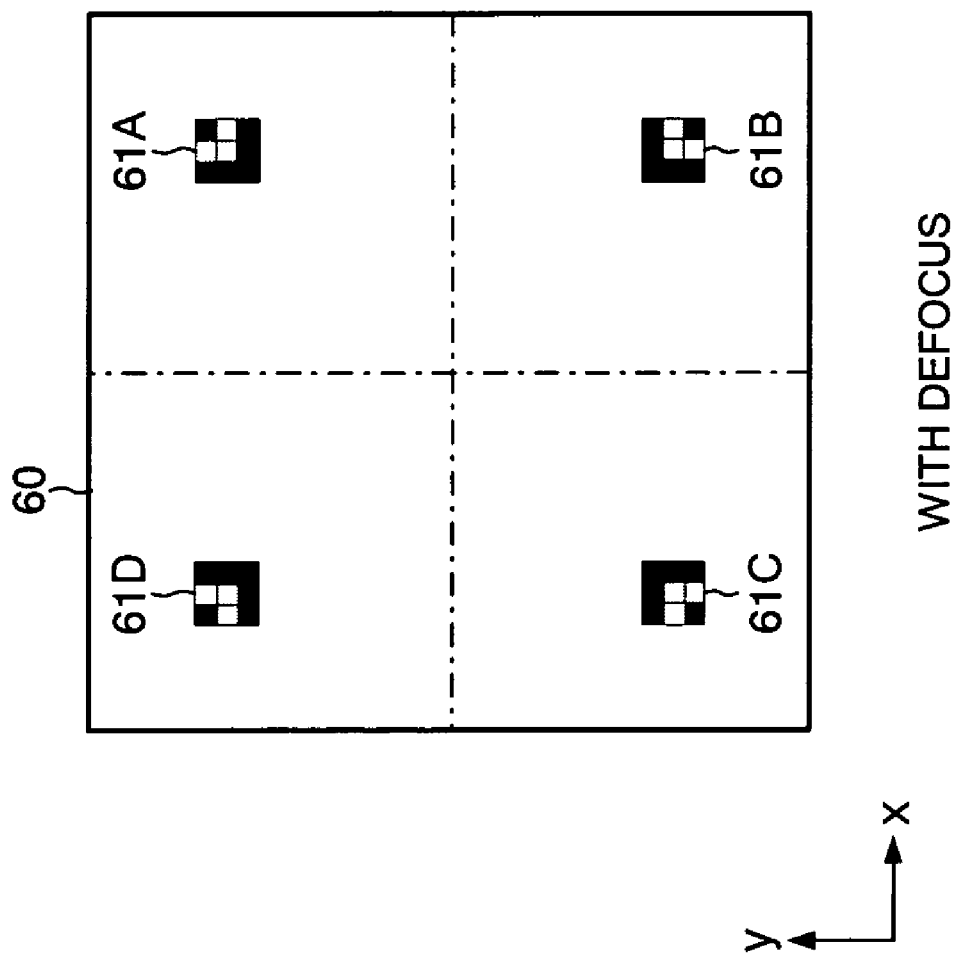
FIG. 27 is a view schematically showing the positions of mark data 61A–61D in the presence of a distortion of the reproduced image.

During reproduction, the distortion detecting circuit 21 detects a deviation of a mark data image in each mark region of the reproduced image, thus detecting a defocus. FIGS. 26 and 27 schematically illustrates mark data 61A–61D positions respectively in the absence of a distortion (defocus) (FIG. 26) and in the presence of a defocus (FIG. 27), wherein the mark data shown in FIG. 14 is used. In the presence of a defocus, it is detected that the mark data 61A–61D is nearer to the center of the reproduced image (FIG. 27) or farther from the center of the reproduced image than those when distortion is absent.

The controller 30 adjusts the application voltage to the distortion corrector (CR) 80 on the basis of the defocus detection signal, thus effecting correction control. Such defocus correction control is preferably repeated until the defocus comes within a predetermined range.

Figure 28:
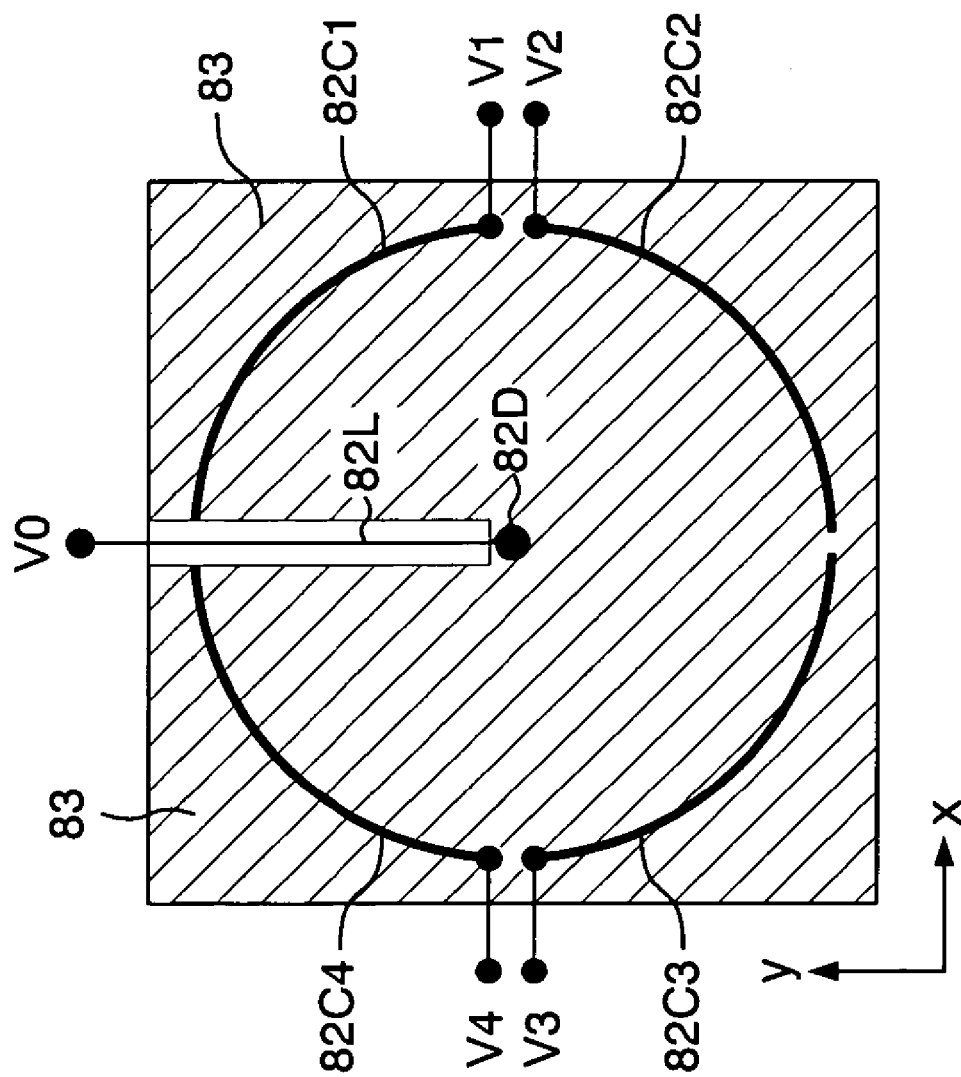
FIG. 28 is a plan view schematically showing an electrode structure of a defocus corrector according to a modification of the fifth embodiment.

FIG. 28 is a plan view schematically showing an electrode structure of a corrector 80 for defocus correction as a modification of the present embodiment. The corrector 80 is provided with quadrant electrodes 82C1, 82C2, 82C3, 82C4 and a dot-like (or small circle) electrode 82D formed centrally of the quadrant electrodes. The quadrant electrodes 82C1, 82C2, 82C3, 82C4 are structured in a form that the circular electrode 82C is divided by 90 degrees into four so that voltages V1, V2, V3, V4 can be independently applied to the respective quadrant electrodes. Accordingly, by applying voltage V0 to the metal electrode 82D and changing the application voltages V1 through V4 to the quadrant electrodes 82C1–82C4, defocus can be corrected. Particularly, because of the capability of changing the application voltages V1 through V4 to the quadrant electrodes 82C1–82C4, defocus correction is possible even when a focus-center deviation or shift occurs.

As mentioned above, because the transparent electrode 83 is higher in electric resistance than the metal electrodes 82C1–82C4, 82D, is caused in the liquid crystal 85 a concentric electric field in accordance with the application voltages V1–V4, V0 respectively to these electrodes. Meanwhile, by changing the voltage V1–V4, V0 (or potential difference between the metal electrode 82C1–82C4 and the metal electrode 82D), the gradient in the electric field distribution can be changed. Accordingly, defocus can be corrected by changing the application voltages to the metal electrodes 82C1–82C4, 82D.

As described above, correction is possible for such a distortion (i.e., defocus) on the photodetector which could not be corrected by the conventional aberration corrector. Thus, recorded data can be correctly reproduced.

Meanwhile, in the above distortion defocus detection, image processing is satisfactorily made only on the data in the mark region. Accordingly, the detection process (image processing, etc.) is easy to carry out, wherein the process can be made correctly and at high speed. Furthermore, because the mark region is provided in a position such that high detection sensitivity can be achieved, detection processing is accurate and easy.

SIXTH EMBODIMENT

Figure 29:
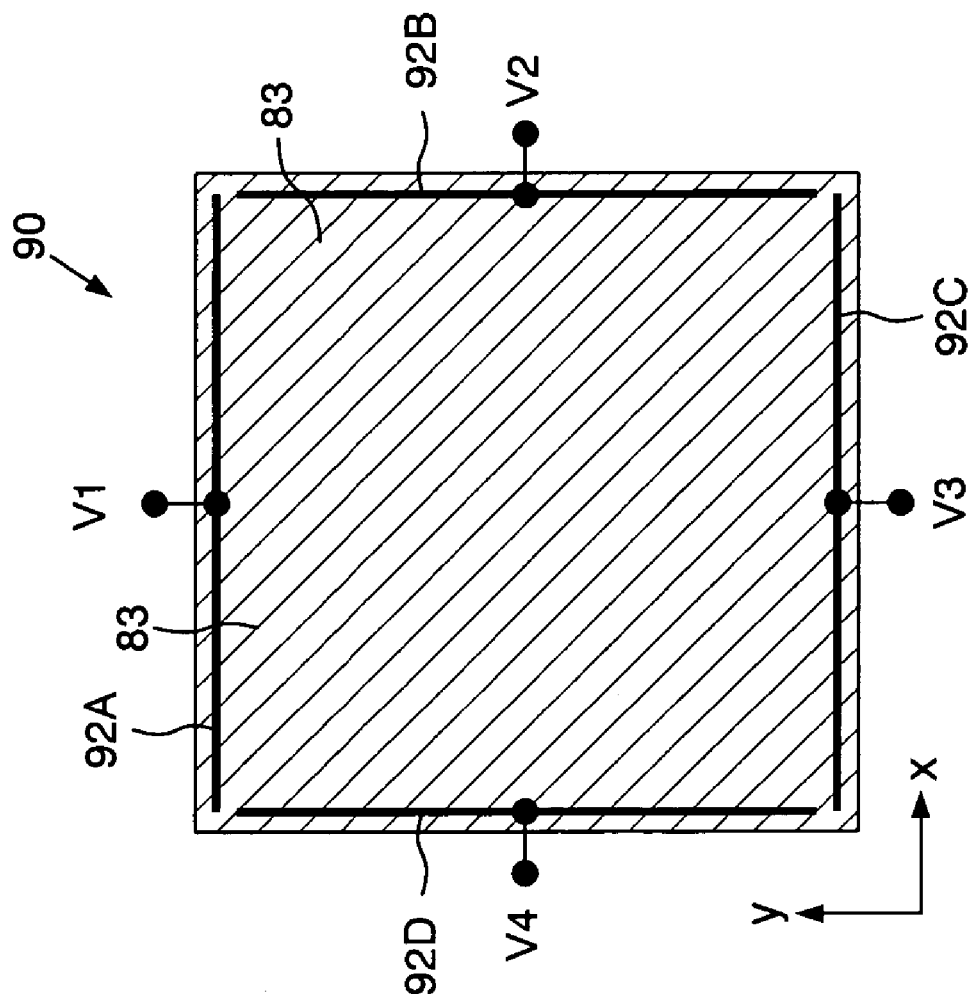
FIG. 29 is a plan view schematically showing an electrode structure of a corrector for correcting a hologram image deviation according to a sixth embodiment of the present invention.

FIG. 29 is a plan view schematically showing an electrode structure of a corrector 90 for correcting a deviation in a hologram image according to the sixth embodiment of the present invention. Specifically, the corrector 90 has a layer structure similar to the structure shown in the sectional view of FIG. 24. As noted before, positional deviation of a hologram-reproduced image is also defined as "distortion". Description is made on a corrector 90 for correcting such distortion (i.e., positional deviation).

As shown in FIG. 29, the transparent electrode layer 83 of the distortion corrector 90 is provided with straight-lined electrodes 92A, 92B, 92C, 92D in the four sides thereof. Structurally, voltages V1, V2, V3, V4 can be independently applied respectively to the straight-lined electrodes. Accordingly, by changing the application voltages V1–V4 to the straight-lined electrodes 92A–92D, positional deviation of a hologram-reproduced image can be corrected.

For example, in order to correct a positional deviation component of hologram image in Y direction in the figure, a potential difference may be provided to between the straight-lined electrodes 92A and 92C. Likewise, in order to correct a positional deviation component of hologram image in X direction in the figure, a potential difference may be provided to between the straight-lined electrodes 92B and 92D.

Incidentally, as described in the fifth embodiment, the structure and operation of detecting a positional deviation is similar to that of the foregoing embodiments. That is, the mark region and mark data shown in the foregoing embodiments can be employed in detecting a positional deviation in a reproduced image. For example, mark region and mark data can be used which has been used in correcting barrel or pincushion distortion as shown in FIG. 14 and in FIG. 17. Additionally, the operations of mark data recording, distortion (positional deviation) detection from the reproduced signal, positional deviation correction control, etc. can be carried out in a similar manner to the foregoing embodiments.

Figure 30:
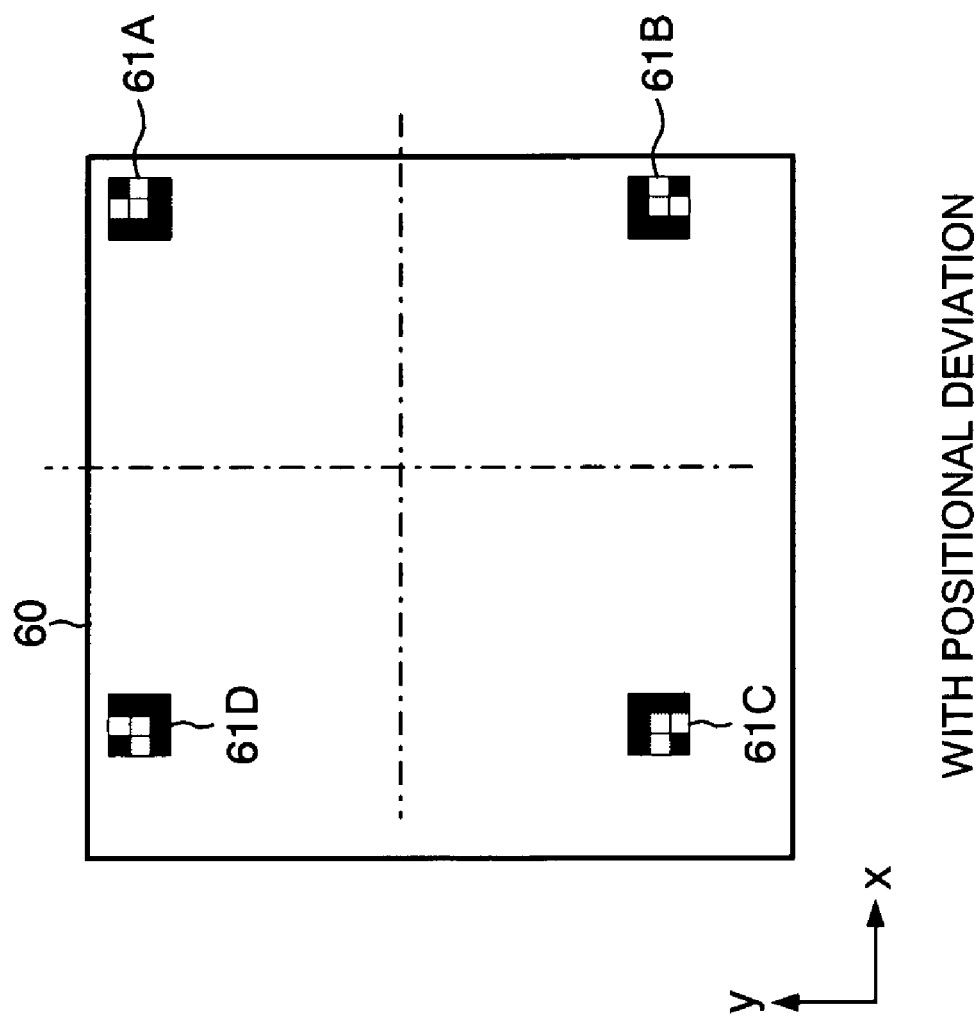
FIG. 30 is a view schematically showing the positions of mark data 61A–61D in the presence of a positional deviation of the reproduced image.

For example, during reproduction, the distortion detecting circuit 21 detects a deviation of a mark data image in each mark region of a reproduced image, thus detecting a positional deviation of the hologram image. FIG. 30 schematically shows the positions of mark data 61A–61D where there is a positional deviation in a reproduced image, when using the mark data shown in FIG. 14. It can be seen that the mark data 61A–61D deviates in X and Y directions (in the upper right direction in the figure) as compared to the absence of a positional deviation in a reproduced image (FIG. 26).

As described in the above, correction is possible for such a distortion on the photodetector which has not been corrected by the conventional aberration corrector. Thus, recorded data can be correctly reproduced.

SEVENTH EMBODIMENT

Figure 31:
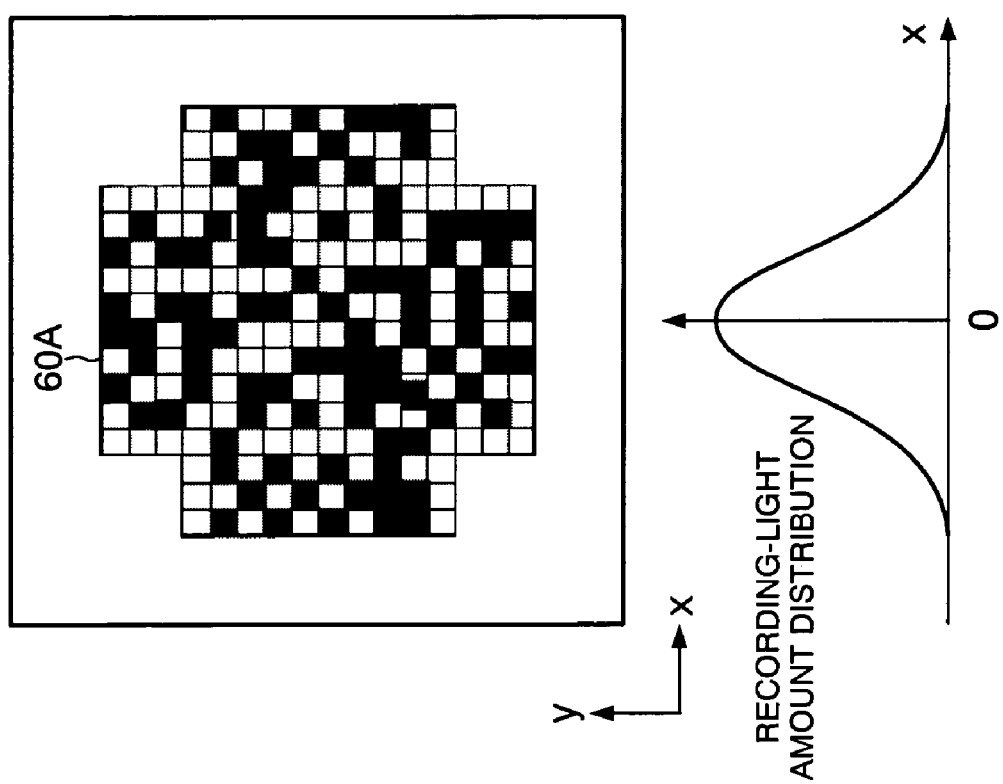
FIG. 31 is a figure illustrating the principle in the case of detecting a positional deviation of hologram image according to a seventh embodiment of the present invention, schematically showing a hologram-recording image and a light amount distribution thereof.
Figure 32:
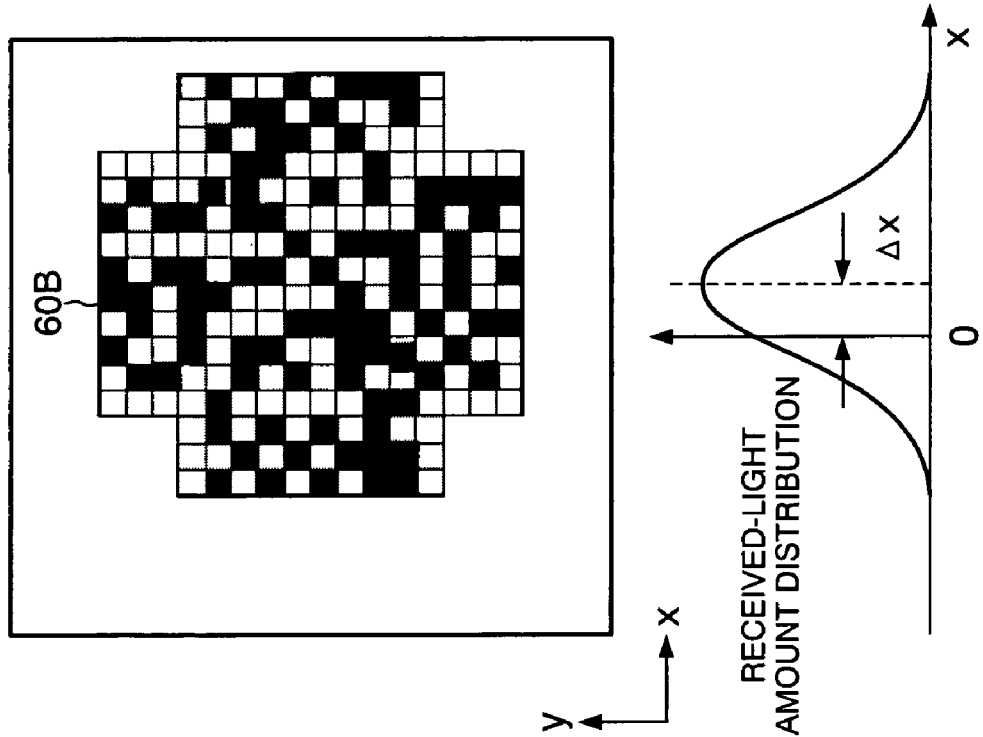
FIG. 32 is a view schematically showing a hologram-reproduced image and a received-light amount distribution of the hologram-reproduced image when positional deviation occurs in the hologram-reproduced image.

Description is made on a case to detect a positional deviation of the hologram image according to a seventh embodiment of the invention. FIGS. 31 and 32 are figures describing the principle of detecting such a positional deviation.

FIG. 31 schematically shows a data image (hologram-recording image) 60A of a signal light beam carrying information data and a light amount distribution of the hologram-recording image. FIG. 32 schematically shows a hologram-reproduced image 60B and a received-light amount distribution for the hologram-reproduced image, when a positional deviation occurs in the hologram-reproduced image. Note that FIGS. 31 and 32 illustrate the data image except mark data.

As shown in FIG. 32, when a positional deviation occurs in the X direction in the hologram-reproduced image, the received-light amount distribution over the hologram-reproduced image has a gravity center deviated in the X direction (deviation: $\Delta x$) relative to a gravity center of the recording-light amount distribution. By calculating the deviation of the gravity center, positional deviation can be determined for the hologram-reproduced image. In a similar manner, positional deviation in the Y direction can be determined for the hologram-reproduced image by calculating a deviation in the Y direction of the gravity center.

Incidentally, although FIGS. 31 and 32 illustrates the example on the data image in which mark data is eliminated, the gravity center of the light amount distribution may be determined as to a hologram-recording image and hologram-reproduced image including mark data.

EIGHTH EMBODIMENT

Figure 33:
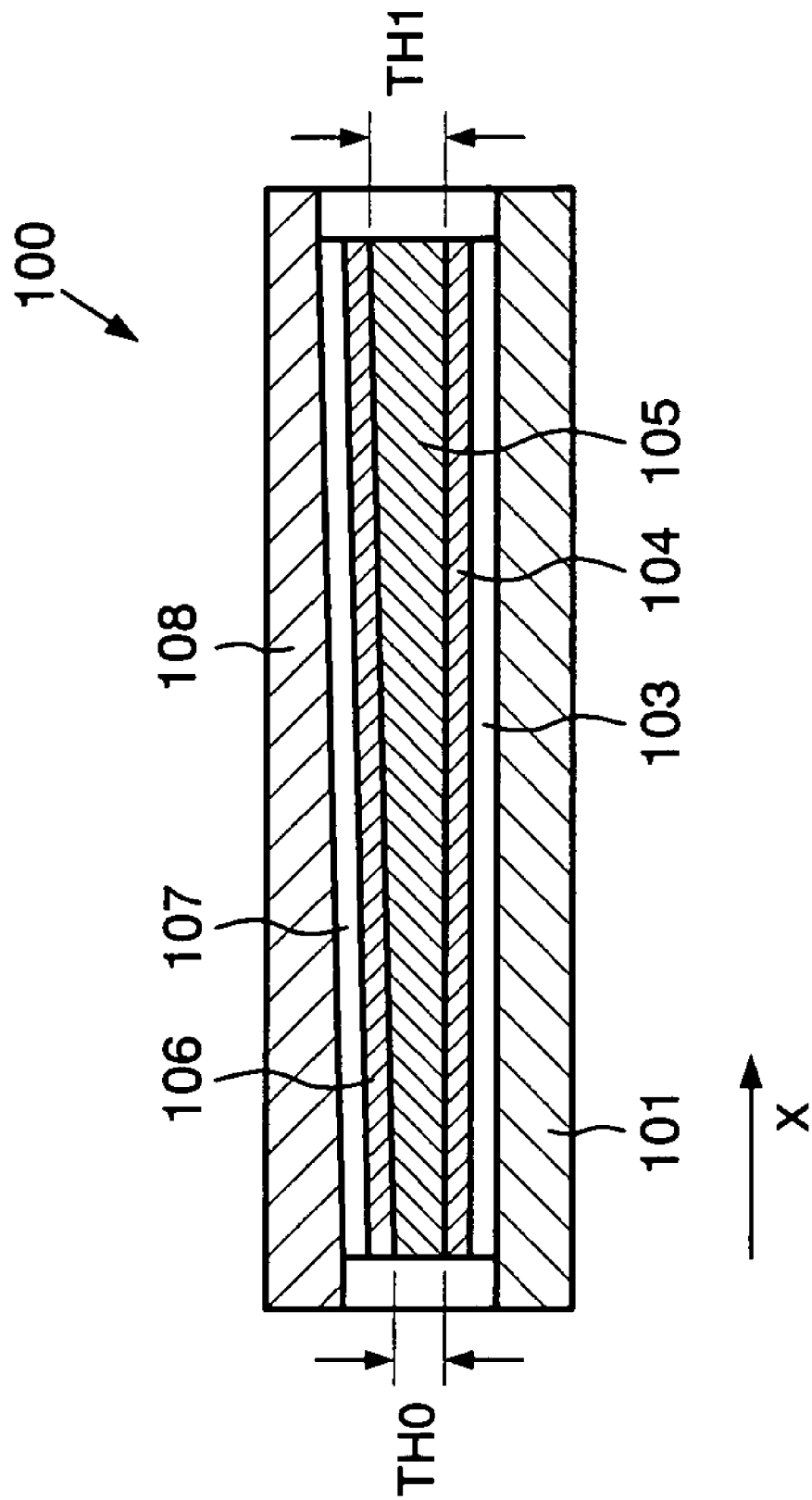
FIG. 33 is a sectional view showing a structure of a corrector for correcting a deviation in the hologram image according to an eighth embodiment of the present invention.

FIG. 33 is a sectional view showing a structure of a corrector 100 for correcting a deviation in the hologram image according to an eighth embodiment of the invention.

The difference from the distortion corrector in the foregoing embodiment lies in that used is a liquid crystal of a form corresponding to the distortion (i.e., positional deviation).

More specifically, the positional-deviation corrector 100 is configured that, on a glass substrate (1) 101, there are formed a transparent electrode 103, an orientation film 104, a liquid crystal 105, an orientation film 106, a low-resistance electrode 107 and a glass electrode (2) 108 one over another in this order.

The liquid crystal 105 is encapsulated in a form, for example, corresponding to a positional deviation in the X direction in the figure and having its thickness changing linearly from TH0 to TH1 in the X direction. Furthermore, differently from the distortion corrector in the foregoing embodiment, no metal electrodes are provided within the transparent electrode 103. The transparent electrode 103 is formed of a material having a low electric resistance so that an application voltage can be applied uniformly to the transparent electrode 103.

In the sixth embodiment using the positional-deviation corrector, the application voltages are changed to the metal electrodes which are provided in the transparent electrode to thereby adjust the distributed phase difference which the liquid crystal provides to a light beam, thus effecting positional-deviation control. However, according to the structure of this embodiment, correction control for positional deviation can be simply effected without requiring such application voltage adjustment. That is, in distortion-correction control in this embodiment, distortion-correction control can be implemented by adjusting the voltage to be applied to the transparent electrode 103 and transparent electrode 107.

The positional-deviation corrector 100 can be used alone or in combination in a plurality thereof. For example, by use of a positional-deviation corrector 100A as to X direction and a positional-deviation corrector 100B as to Y direction (or a corrector which the corrector 100 is rotated 90 degrees), a corrector similar to that of the sixth embodiment can be configured which is capable of correcting a positional deviation independently in the X directional component and Y directional component.

Figure 34:
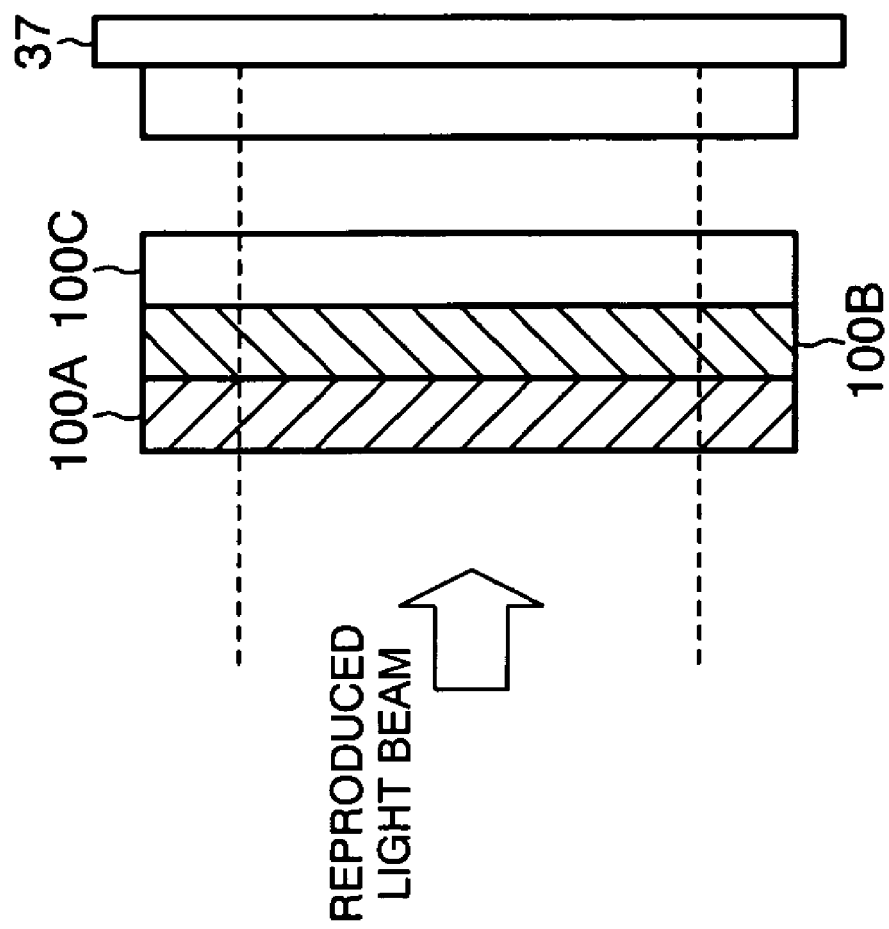
FIG. 34 is a figure schematically showing a corrector which is a combination of X-directional and Y-directional correctors and a third corrector.

Furthermore, it is possible to combine a third corrector 100C, e.g. a defocus corrector or a barrel or pincushion corrector, in addition to the X-directional corrector 100A and Y-directional corrector 100B, as shown in FIG. 34.

NINTH EMBODIMENT

Figure 35:
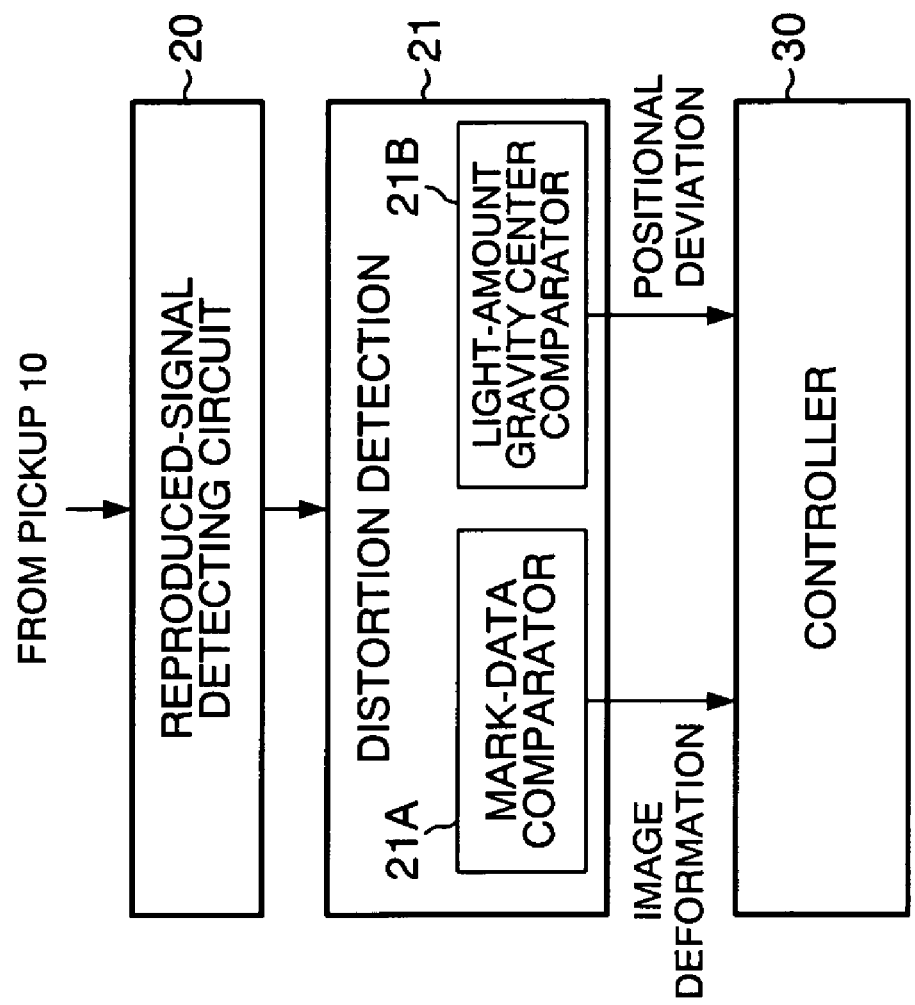
FIG. 35 is a block diagram showing a configuration of a hologram-image distortion detecting circuit according to a ninth embodiment of the present invention.

FIG. 35 is a block diagram showing a structure of a hologram-image distortion detecting circuit 21 according to a ninth embodiment of the invention.

The distortion detecting circuit 21 in this embodiment detects a distortion on the basis of a reproduced signal from the reproduction-signal detection processing circuit 20. More specifically, the distortion detecting circuit 21 has a mark-data comparator 21A and a light-amount gravity center comparator 21B.

The mark-data comparator 21A compares the make data of a hologram-recording image and hologram-reproduced image and detects a distortion as to an image deformation of barrel or pincushion type, to supply a distortion detection signal (image-deformation detection signal) to the controller 30.

Meanwhile, the light-amount gravity center comparator 21B compares the light amount distribution of the hologram-recording image and the received-light amount distribution of the hologram-reproduced image and detects a distortion as to a positional deviation of the hologram-reproduced image, to supply a distortion detection signal (positional-deviation detection signal) to the controller 30.

The controller 30 drives the distortion detector (CR) 50 on the basis of the image-deformation detection signal and positional-deviation detection signal. Having the configuration and operation, even where the distortion in which image deformation and positional deviation are combined, image-deformation and positional-deviation components can be independently detected for the hologram-reproduced image. Accordingly, combined distortion can be corrected with correctness and high accuracy.

Incidentally, in this embodiment, the positional-deviation corrector (CR) 50 can use the distortion correctors in the foregoing embodiments alone or in combination. For example, with the single use of a barrel-distortion corrector shown in FIG. 7, a pincushion-distortion corrector shown in FIG. 10 or a corrector for defocus correction shown in FIGS. 24 and 28, the relevant combined distortion can be corrected by adjusting the application voltages on the basis of the image-distortion and positional-deviation components of the hologram-reproduced image.

As described in detail above, under correction control using a corrector for correcting a hologram image distortion of barrel or pincushion type, defocus, positional deviation or the like, a favorable reproduced image free of distortion is obtained on the reproduction-image detector 37. Thus, recorded data can be read out with correctness. Meanwhile, in distortion detection, image processing, etc. can be satisfactorily carried out only on the data in the mark region. Accordingly, the detection process (image processing, etc.) is easy to carry out, wherein the process can be made correctly and at high speed. Furthermore, detection process is accurate and easy because the mark region is provided in a position so as to achieve high distortion detection sensitivity.

Incidentally, the embodiments can be applied by a proper combination.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Applications No. 2004-016450 and No. 2004-322107 which are hereby incorporated by reference.

What is claimed is:

1. A hologram apparatus for hologram recording and/or reproducing information data with a recording medium by use of a coherent light beam, comprising:
   a light beam generating section for generating a reference light beam and a coherent light beam coherent to the reference light beam;
   a spatial light modulator for spatially modulating the coherent light beam;
   a signal light beam generating section for driving the spatial light modulator by superimposing distortion-detecting data for detecting a distortion of a hologram-reproduced image on the information data to generate a signal light beam;
   a light beam interfering section for allowing the reference light beam and the signal light beam to enter the recording medium and causing interference, so as to form a hologram recording region by means of interference light;

a reproducing section for allowing the reference light beam to be incident on the hologram recording region and generating a reproduced light corresponding to the signal light beam;

an image sensor section for receiving the reproduced light to detect a hologram-reproduced image;

a distortion determining section for detecting the distortion-detecting data from the hologram-reproduced image to determine a distortion of the hologram-reproduced image;

a distortion corrector for correcting a distortion of the hologram-reproduced image; and a controller for adjusting the distortion corrector in accordance with a distortion determined by the distortion determining section to correct a distortion of the hologram-reproduced image.

2. A hologram apparatus according to claim 1, wherein the distortion corrector includes a first electrode divided corresponding to a predetermined form of distortion of a hologram-reproduced image, a second electrode opposed to the first electrode and a liquid crystal for providing a distributed phase difference to a light beam transmitting by application of voltage to the first and second electrodes.

3. A hologram apparatus according to claim 2, wherein the predetermined form of distortion is any one of barrel distortion, pincushion distortion, trapezoidal distortion, a defocus and a positional deviation of the image.

4. A hologram apparatus according to claim 2, wherein the predetermined form of distortion is combined distortion including at least two of barrel distortion, pincushion distortion, trapezoidal distortion, a defocus and a positional deviation of the image.

5. A hologram apparatus according to claim 1, further comprising a distortion-detection setting section for setting within a hologram-reproduced image region a distortion detecting region corresponding to a predetermined form of distortion of a hologram-reproduced image.

6. A hologram apparatus according to claim 5, wherein the distortion-detection setting section determines distortion-detecting data to be arranged in the distortion detecting region.

7. A hologram apparatus according to claim 5, wherein the predetermined form of distortion is any one of barrel distortion, pincushion distortion, trapezoidal distortion, a defocus and a positional deviation of the image.

8. A hologram apparatus according to claim 5, wherein the predetermined form of distortion is combined distortion including at least two of barrel distortion, pincushion distortion, trapezoidal distortion, a defocus and a positional deviation of the image.

9. A hologram apparatus according to claim 1, wherein the spatial light modulator superimposes the distortion-detecting data at an interval of a predetermined data pages of the information data.

10. A hologram apparatus according to claim 1, wherein the spatial light modulator uses dummy data as the information data.

11. A hologram apparatus according to claim 1, wherein the controller performs servo-control of the distortion corrector in accordance with a distortion amount determined in the distortion determining section.

12. A hologram apparatus according to claim 1, wherein the distortion corrector includes first and second electrodes opposed to each other and a liquid crystal sandwiched between the first and second electrodes and having a form corresponding to a predetermined form of distortion of a hologram-reproduced image.

13. A hologram apparatus according to claim 1, wherein the distortion determining section detects a deviation in a detecting position of the distortion-detecting data in the hologram-reproduced image relative to a recording position in the hologram-recording image of the distortion-detecting data superposed on the information data to determine a distortion of the hologram-reproduced image.

14. A hologram apparatus according to claim 1, comprising a positional deviation detector for determining a received-light amount gravity center of the hologram-reproduced image and a recording-light amount gravity center of the hologram-recording image on the basis of the signal light beam, and detects a deviation of the received-light amount gravity center relative to the recording-light amount gravity center, to thereby detect a positional deviation of the hologram-reproduced image.

* * * * *